(12) United States Patent
Koga

(10) Patent No.: US 8,649,104 B2
(45) Date of Patent: Feb. 11, 2014

(54) OPTICAL ELEMENT, OPTICAL ELEMENT ARRAY, AND METHOD OF MANUFACTURING OPTICAL ELEMENT

(75) Inventor: Ko Koga, Setagaya-ku (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 265 days.

(21) Appl. No.: 13/146,283

(22) PCT Filed: Apr. 14, 2010

(86) PCT No.: PCT/JP2010/056696
§ 371 (c)(1),
(2), (4) Date: Jul. 26, 2011

(87) PCT Pub. No.: WO2011/128995
PCT Pub. Date: Oct. 20, 2011

(65) Prior Publication Data
US 2012/0057243 A1    Mar. 8, 2012

(51) Int. Cl.
*G02B 1/06* (2006.01)
(52) U.S. Cl.
USPC ................. 359/667; 359/665; 359/666
(58) Field of Classification Search
USPC .................................. 359/665–667
See application file for complete search history.

(56) References Cited

U.S. PATENT DOCUMENTS

2005/0265715 A1* 12/2005 Butterworth .................. 396/506
2010/0309560 A1* 12/2010 Dharmatilleke et al. ..... 359/666

FOREIGN PATENT DOCUMENTS

| JP | 2006 64947 | 3/2006 |
| JP | 2007 307788 | 11/2007 |
| JP | 2008 521044 | 6/2008 |
| JP | 2008 298821 | 12/2008 |
| JP | 2010 14808 | 1/2010 |
| WO | 2009 072323 | 11/2009 |

OTHER PUBLICATIONS

International Search Report issued Jun. 22, 2010 in PCT/JP10/056696 filed Apr. 14, 2010.
Koga, K., et al., "Numerical Study on Gas-Liquid Interface in a Microchannel," The Japan Society of Mechanical Engineers, vol. 68, No. 669, pp. 1344-1351, (May 25, 2002) (with English Abstract).

* cited by examiner

*Primary Examiner* — Jordan Schwartz
(74) *Attorney, Agent, or Firm* — Oblon, Spivak, McClelland, Maier & Neustadt, L.L.P.

(57) ABSTRACT

Disclosed are an optical element, an optical element array, and a method of manufacturing an optical element capable of forming a desired interface shape. In a microlens and a microlens array, at least one of a transparent liquid forming a liquid phase and microbubbles forming a gas phase is subjected to temperature adjustment by a curvature control part. The transparent liquid and the microbubbles subjected to temperature adjustment thermally expands or contracts, such that the shape of a curved interface formed between the transparent liquid and the microbubbles is changed.

7 Claims, 19 Drawing Sheets

OPTICAL ELEMENT, OPTICAL ELEMENT ARRAY, AND METHOD OF MANUFACTURING OPTICAL ELEMENT

TECHNICAL FIELD

The present invention relates to an optical element, an optical element array, and a method of manufacturing an optical element.

BACKGROUND ART

In the related art, as described in Japanese Unexamined Patent Application Publication No. 2008-298821, as an optical element, a diffraction grating is known through which light passes to control the diffraction angle of light. The diffraction grating includes partition walls arranged in parallel at regular intervals. An insulating liquid and a conductive liquid are filled between adjacent partition walls. A voltage is applied to the conductive liquid to change the position of the interface formed between the liquids, such that the grating constant is made variable.

The diffraction grating uses an electrowetting phenomenon (electrocapilliary phenomenon). The electrowetting phenomenon is the phenomenon that, when a voltage is applied to the conductive liquid and the electrode, the surface tension of the liquid is changed and the shape of the liquid surface is thus changed. With the use of this phenomenon, in the diffraction grating, the voltage to be applied increases to lower the surface tension of the liquid and to raise the position of the interface.

CITATION LIST

Patent Literature

[Patent Literature 1] Japanese Unexamined Patent Application Publication No. 2008-298821

SUMMARY OF INVENTION

Technical Problem

However, in the above-described diffraction grating, the voltage is applied to the liquid to change the shape or position of the interface, making it difficult to change the interface in a desired shape or to a desired position.

Accordingly, the invention has been finalized in order to solve the technical problem, and an object of the invention is to provide an optical element, an optical element array, and a method of manufacturing an optical element capable of forming a desired interface shape.

Solution to Problem

That is, the invention provides an optical element. The optical element includes a container which transmits light, a first transparent material which is accommodated in the container to form a first phase, a second transparent material which is accommodated in the container to form a second phase different from the first phase, a curved interface rounded toward the first transparent material being formed between the first transparent material and the second transparent material, and interface shape control means for carrying out temperature adjustment on at least one of the first transparent material and the second transparent material to control the shape of the interface.

According to the invention, the interface shape control means carries out temperature adjustment on at least one of the first transparent material forming the first phase and the second transparent material forming the second phase. The transparent material subjected to temperature adjustment thermally expands or contracts, such that the shape of the curved interface formed between the first transparent material and the second transparent material is changed. Thus, it becomes possible to control the interface shape, thereby forming a desired interface shape. Here, when a current is applied for temperature adjustment, it is possible to reduce a voltage to be applied compared to a case where a voltage is directly applied to the material in the container to change the surface tension of the material. Therefore, if a method which uses Joule heat based on a current is used, it is possible to reduce a voltage to be applied and also to form a desired interface shape.

It is preferable that the first phase is a liquid phase, and the second phase is a gas phase.

According to the invention, the second transparent material forming the gas phase is hardly influenced by gravity because of a small mass per volume (low density). Therefore, it is possible to control the shape of the interface accurately. It is also possible to prevent deterioration in quality due to mixture compared to a liquid-liquid system.

It is preferable that the interface shape control means thermally expands or contracts at least one of the first transparent material and the second transparent material to control the shape of the interface.

According to the invention, the interface shape control means thermally expands or contracts at least one of the first transparent material and the second transparent material, making it easy to change the shape of the interface. Therefore, it becomes possible to control the interface shape.

It is preferable that the interface shape control means controls the curvature of the interface.

According to the invention, since the interface shape control means controls the curvature of the interface, it is possible to control refractive power (lens power) when light passes through the container.

It is preferable that the interface shape control means has a plate-shaped heat-generating portion formed at the bottom of the container to generate heat through electrical connection, and the heat-generating portion has a small-width portion at the center thereof.

According to the invention, since electrical resistance increases in the small-width portion at the center of the heat-generating portion, the temperature of the small-width portion is at the highest in the heat-generating portion. Thus, it is possible to sufficiently heat the transparent material near the center of the heat-generating portion with a small current. Therefore, it is possible to easily thermally expand the transparent material and to easily change the phase of the transparent material, making it easy to control the shape of the transparent material.

It is preferable that the container has a first wall portion and a second wall portion arranged to face each other, and the second transparent material is arranged separately around the first wall portion and the second wall portion.

According to the invention, the first transparent material is arranged so as to be sandwiched from both sides thereof by the second transparent material between the first wall portion and the second wall portion. Here, the shape of the interface formed between the first transparent material and the second transparent material becomes a curved shape rounded from the second transparent material toward the first transparent material. For this reason, an interface is formed which has two faces respectively rounded from the first wall portion and the second wall portion inside the container. Therefore, a concave lens can be formed between the first wall portion and the second wall portion by the two-face interface.

It is preferable that two containers are provided, each container has a first wall portion and a second wall portion arranged to face each other, in each container, the second transparent material is arranged around the first wall portion, and the first wall portions of the two containers are bonded to each other.

According to the invention, in each of the two containers, the interface is formed in a shape rounded from the first wall portion toward the second wall portion, and the first wall portions of the two containers are bonded to each other. With this configuration, a convex lens can be formed over the two containers such that the bonded first wall portions are included in a cross-section.

According to an optical element array in which a plurality of optical elements are arranged, in each optical element, it is possible to control the shape of the interface formed in the container. Thus, it is possible to freely change the refractive power of each optical element. For example, if a plurality of light sources are arranged and the optical elements are arranged to correspond to the light sources, it is possible to freely condense or diffuse light emitted from a plurality of light sources.

The invention provides a method of manufacturing an optical element in which a conductive liquid is filled in a container transmitting light. The method includes an electrode forming step of using a container having one opened surface, forming a first electrode at a position of the one surface, and forming a second electrode at a position of another surface facing the one surface, a liquid inflow step of charging a liquid, applying a voltage having reverse charge to the liquid to the first electrode, and allowing the liquid to flow into the container from the one surface, and a liquid filling step of applying a voltage having the same charge as the liquid to the first electrode, applying a voltage having reverse charge to the liquid to the second electrode, and filling the liquid in the container.

In the method of manufacturing an optical element according to the invention, in the liquid inflow step, the charged liquid flows into the container from the one surface, and a voltage having reverse charge to the liquid is applied to the first electrode formed at the position of the one surface. For this reason, the wetness of the liquid in contact with the surface of the first electrode is improved. Thus, it is possible to allow the liquid to smoothly flow from the one surface. In the liquid filling step, a voltage having the same charge as the liquid is applied to the first electrode, and a voltage having reverse charge to the liquid is applied to the second electrode. For this reason, the wetness of the liquid in contact with the surface of the second electrode is improved. Thus, it is possible to fill the liquid at the corners in the periphery of another surface.

According to the method of manufacturing an optical element, even when the container is of a small size, the liquid can be filled at the corners of the container. Therefore, it is possible to appropriately manufacture the optical element and the optical element array in which the transparent material is accommodated in the container.

Advantageous Effects of Invention

According to the invention, it is possible to reduce a voltage to be applied and also to form a desired interface shape.

DESCRIPTION OF EMBODIMENTS

Hereinafter, an optical element according to an embodiment of the invention will be described with reference to the drawings. In the description of the drawings, the same elements are represented by the same reference numbers, and overlapping description will be omitted.

First Embodiment

Figure 1:
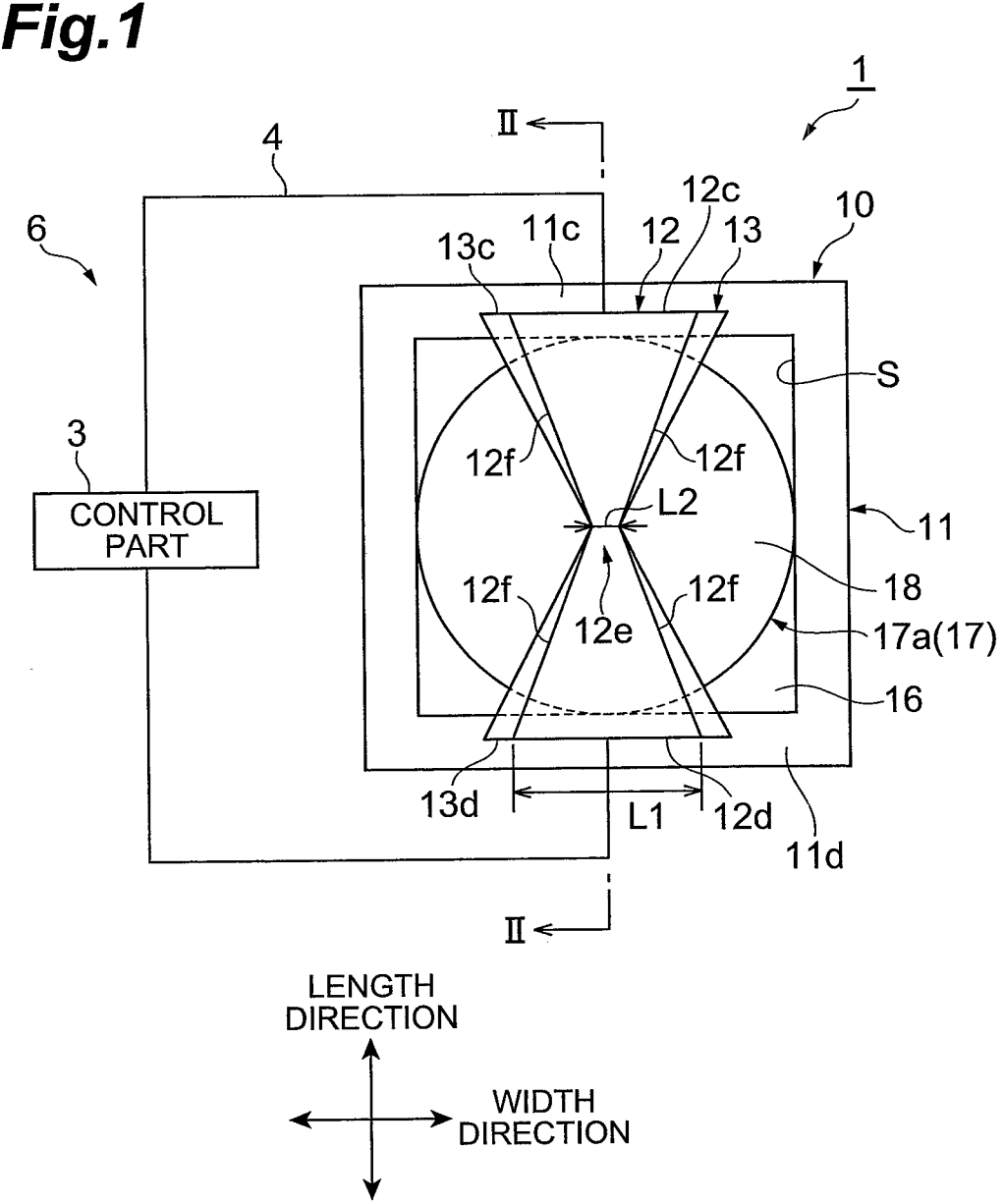
FIG. 1 is an outline diagram showing an optical element according to a first embodiment of the invention.
Figure 2:
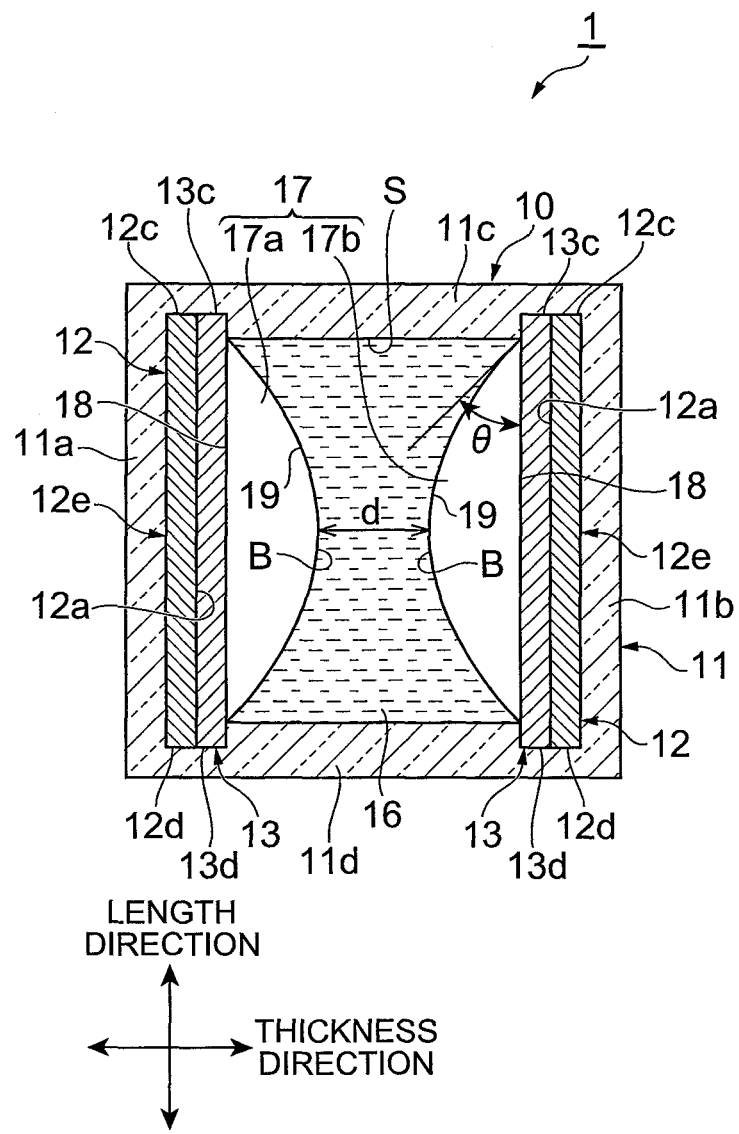
FIG. 2 is a sectional view of a container part taken along the line II-II of FIG. 1.

FIG. 1 is an outline diagram showing an optical element according to a first embodiment. FIG. 2 is a sectional view of a container part taken along the line II-II of FIG. 1. A microlens (optical element) 1 of this embodiment is arranged on the emission side of, for example, a laser light source, and refracts laser light emitted from the laser light source.

The microlens 1 includes a hollow container 10 which substantially has a cubic shape and transmits light. The container 10 is formed of a transparent insulating film, and is constituted by a six-face wall portion 11 having a predetermined thickness. The six-face wall portion 11 forms an internal space S substantially having a closed cubic shape, and the container 10 is configured such that a liquid or gas can be filled in the internal space S. Examples of the transparent insulating film forming the container 10 include strontium titanate, lithium niobate, and the like. The size of the container 10 is not particularly limited, and the length of one side is typically about 50 to 100 μm.

In the six-face wall portion 11 constituting the container 10, a first sidewall (wall portion) 11a and a second sidewall (wall portion) 11b (see FIG. 2) which are wall portions arranged to face each other function as the light-transmissive surface of the container 10. Although in FIG. 1, to facilitate understanding of the internal configuration of the container 10, the first sidewall 11a is not shown, and the first sidewall 11a is located in the near-side face of the drawing. Hereinafter, the first sidewall 11a and the second sidewall 11b are also simply referred to as "sidewalls 11a and 11b".

In addition to the container 10, the microlens 1 includes plate-shaped heaters (heat-generating portion) 12 and 12 which are respectively formed in the sidewalls 11 and 11b to generate heat through electrical connection, a control part 3 which is connected to the heaters 12 and 12 by wirings 4 to apply a current to the heaters 12 and 12 and to control the amount of heat generation, and plate-shaped insulating films 13 and 13 which are formed so as to cover the surfaces (the surfaces on the internal space S side) 12a of the heaters 12 and 12 from the internal space S side of the container 10. In FIG. 2, the control part 3 is not shown (hereinafter, the same is applied to FIGS. 4, 5, 7, and 8).

The microlens 1 includes a transparent liquid (first transparent material) 16 which is accommodated in the container 10 and forms a liquid phase (first phase), and microbubbles (second transparent material) 17 which are bubbles accommodated in the container 10 to form a gas phase (second phase), a curved interface B (see FIG. 2) rounded toward the transparent liquid 16 being formed between the transparent liquid 16 and the microbubbles 17. That is, the transparent liquid 16 and the microbubbles 17 form different phases.

The heaters 12 generate heat and transmit heat to the microbubbles 17 and the transparent liquid 16, such that the microbubbles 17 and the transparent liquid 16 thermally expand or contract. The heater 12 is a transparent electrode which is formed of zinc oxide (ZnO), indium tin oxide (ITO), or the like. The heaters 12 are formed in a part on the inner wall surfaces of the sidewalls 11a and 11b. The heaters 12 extend over an upper wall 11c and a lower wall 11d (hereinafter, also simply referred to as "walls 11c and 11d") which connect the end sides of the sidewalls 11a and 11b and face each other. That is, the heaters 12 are configured such that the length thereof in the longitudinal direction (the up-down direction of FIG. 1) is slightly longer than the length of one side of the internal space S, and the end portions 12c and 12d in the longitudinal direction are respectively in contact with the walls 11c and 11d.

In the following description, the direction perpendicular to the wall surfaces of the sidewalls 11a and 11b (the direction perpendicular to the heaters 12) is referred to as the "thickness direction", the direction perpendicular to the walls 11c and 11d (the direction parallel to the longitudinal direction of the heaters 12) is referred to as the "length direction", and the direction parallel to the sidewalls 11a and 11b and the walls 11c and 11d (the direction parallel to the lateral direction of the heaters 12) is referred to as the "width direction".

As shown in FIG. 1, the end portions 12c and 12d of the heaters 12 have a length in the width direction corresponding to a width L1. Each heater 12 has a small-width portion 12e at the center thereof. Here, the term "center" refers to the intermediate position between one end portion 12c and another end portion 12d, and includes "substantially center". The small-width portion 12e has a length in the width direction which corresponds to a width L2 smaller than the width L1. The heater 12 has a shape with a gradually decreasing length in the width direction from the end portions 12c and 12d toward the small-width portion 12e. In this way, the heater 12 has a shape symmetrical with respect to the small-width portion 12e.

The control part 3 controls the amount of heat generation of the heaters 12 to thermally expand or contract the microbubbles 17 and the transparent liquid 16, and controls the curvature of the interface B. In other words, the control part 3 carries out temperature adjustment of the microbubbles 17 and the transparent liquid 16 to control the shape of the interface B. The control part 3 has means for detecting the amount of heat generation of the heaters 12 or the temperature of the microbubbles 17 and the transparent liquid 16. The control part 3 performs control to supply the transparent liquid 16 into the container 10 and control to discharge the transparent liquid 16 from the container 10. In the control to supply and discharge the transparent liquid 16, any method may be used insofar as the transparent liquid 16 can be supplied and discharged through the container 10. The control part 3 has a computer which includes a CPU (Central Processing Unit), a ROM (Read Only Memory), and a RAM (Random Access Memory) for an arithmetic operation relating to shape control of the interface B.

The insulating films 13 covering the heaters 12 prevent the heaters 12 from coming into contact with the microbubbles 17 and the transparent liquid 16 and transmit heat from the heaters 12 to the microbubbles 17 and the transparent liquid 16. The insulating films 13 are formed of a transparent insulating film, such as strontium titanate or lithium niobate, and covers the entire surfaces 12a of the heaters 12. Specifically, each insulating film 13 has an outer shape slightly greater than the outer shape of the heater 12. That is, the end portions 13c and 13d of the insulating film 13 in the length direction have a length slightly longer than the width L1 of the end portions 12c and 12d of the heater 12. The insulating film 13 covers the end surface (not shown) extending in the thickness direction in the end portion 12f (see FIG. 1) of the heater 12 in the width direction. The wirings 4 are respectively connected to the end portions 12c and 12d.

Here, in each of the first sidewall 11a, the second sidewall 11b, and the insulating film 13, it is preferable that the surface facing the internal space S is processed so as to improve wetness for shape control of the microbubbles 17 described below.

The container 10, the heaters 12, the control part 3, the wirings 4, and the insulating films 13 can be manufactured by an existing semiconductor manufacturing technique. The manufacturing method is the same as a manufacturing processing of a microlens array described below.

The transparent liquid 16 and the microbubbles 17 have different phases, and are materials having the same composition. As the transparent liquid 16 and the microbubbles 17, for example, perfluorocarbon (Fluorinert (Registered Trademark)), silicone, or the like may be used. The transparent liquid 16 locally boils when receiving heat from the heater 12, and becomes vapor bubbles, which become the microbubbles 17. At this time, the transparent liquid 16 is discharged by the control part 3 such that the total volume of the transparent liquid 16 and the microbubbles 17 coincides with the volume of the internal space S. The microbubbles 17 are cooled through heat release from the container 10 to the outside and condensed to become the transparent liquid 16. At this time, the transparent liquid 16 is supplied by the control part 3 such that the total volume of the transparent liquid 16 and the microbubbles 17 coincides with the volume of the internal space S. With this control, the total volume of the transparent liquid 16 and the microbubbles 17 coincides with the volume of the internal space S. The transparent liquid 16 and the microbubbles 17 are controlled to have predetermined volume and shape by the control part 3.

The microbubbles 17 are symmetrically arranged separately at two places around the first sidewall 11a and the second sidewall 11b (see FIG. 2). The microbubbles 17 substantially have a dome shape rounded so as to approach each other, and the bottom surfaces 18 thereof come into contact with the sidewalls 11a and 11b and the insulating film 13 and are inscribed in the internal space S when viewed from the thickness direction (see FIG. 1). The microbubbles 17 have a spherical shape (curved shape) in which the dome portions 19 (see FIG. 2) thereof are rounded inside the internal space S, and the interface B is formed between the transparent liquid 16 and the microbubbles 17. A contact angle between the rising portions of the dome portions 19 (the portions near the bottom surface 18) and the sidewalls 11a and 11b is determined at a predetermined angle θ depending on the state of surface treatment.

In the following description, the microbubble 17 formed around the first sidewall 11a is referred to as an incidence-side microbubble 17a, and the microbubble 17 formed around the second sidewall 11b is referred to as an emission-side microbubble 17b (see FIG. 2).

The incidence-side microbubble 17a and the emission-side microbubble 17b are separated at a distance d in the thickness direction. The transparent liquid 16 is arranged so as to be sandwiched from both sides thereof by the incidence-side microbubble 17a and the emission-side microbubble 17b. The interface B is formed which has two faces between the incidence-side microbubble 17a and the transparent liquid 16 and between the emission-side microbubble 17b and the transparent liquid 16, such that a concave lens is formed between the first sidewall 11a and the second sidewall 11b.

The incidence-side microbubble 17a and the emission-side microbubble 17b may not be symmetrically arranged and may have different shapes. Shape control of the microbubble 17 will be described below.

Figure 3:
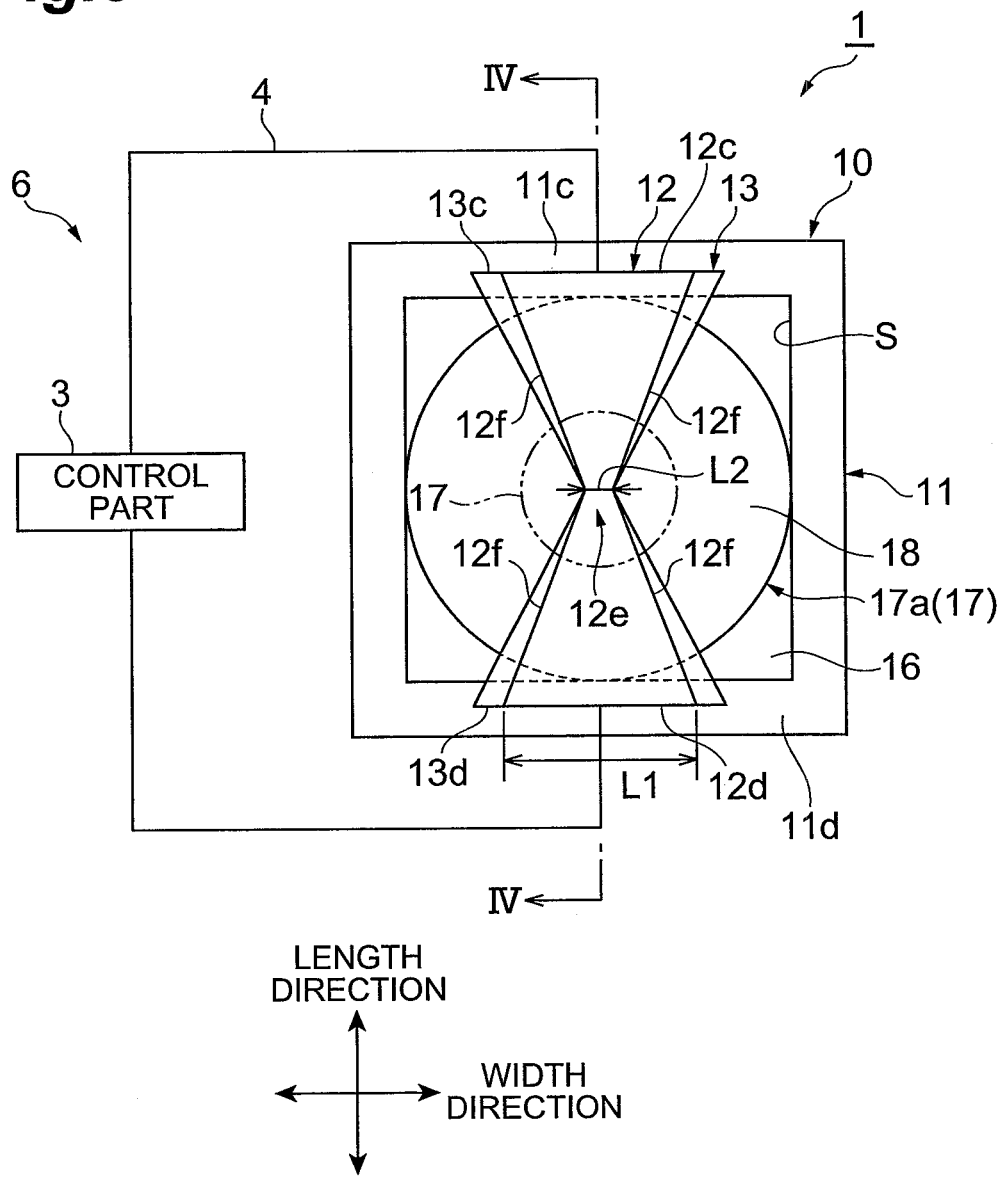
FIG. 3 is a conceptual diagram showing the growing state of bubbles in the optical element of FIG. 1.
Figure 4:
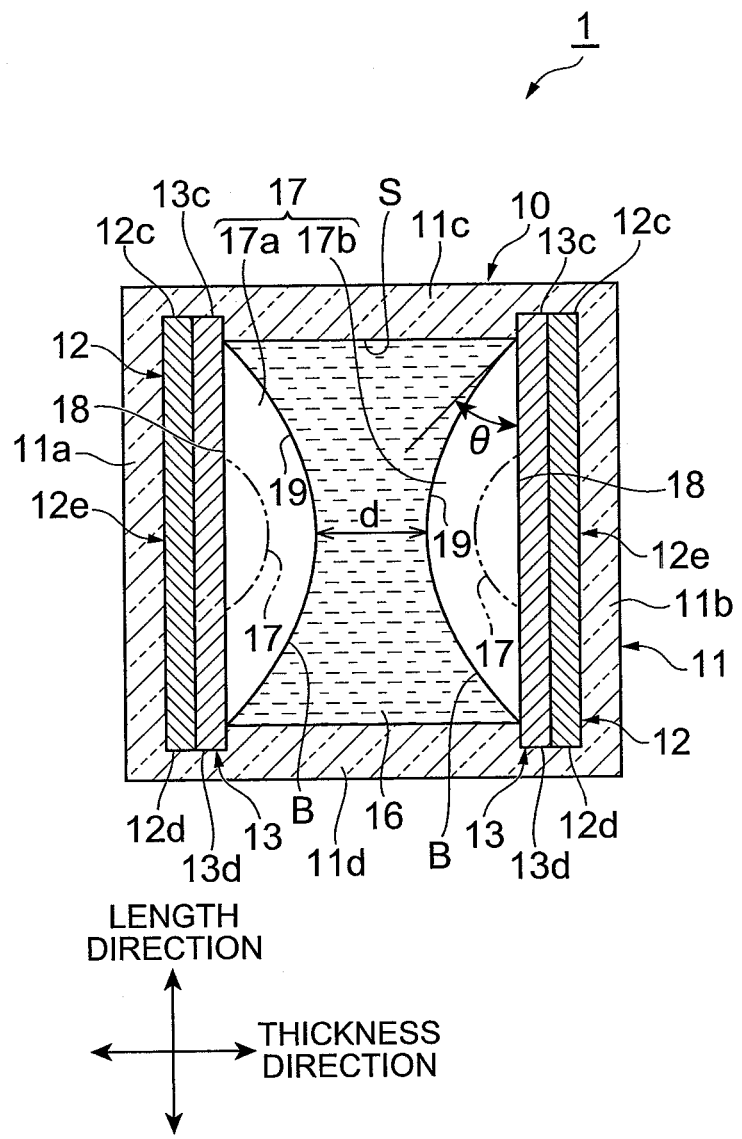
FIG. 4 is a sectional view of a container part taken along the line IV-IV of FIG. 3.

FIG. 3 is a conceptual diagram showing the growing state of a bubble in the microlens 1. FIG. 4 is a sectional view of a container 10 part taken along the line Iv-Iv of FIG. 3. First, the transparent liquid 16 at a predetermined temperature is filled in the container 10. If a voltage is applied to the heaters 12 by the control part 3 and a current flows in the heaters 12, the small-width portions 12e of the heaters 12 generate heat in accordance with the following expression (1).

[Equation 1]

$$Q = RI^2 = mct \qquad (1)$$

In the expression (1), the following definition is made.
Q: an amount of heat generation
R: resistance of the small-width portion 12e
I: current flowing in the heater 12
m: the weight of the transparent liquid 16
c: specific heat of the transparent liquid 16
t: an electrical connection time If heat is generated in the small-width portion 12e of each heater 12 with the amount Q of heat generation, heat is transmitted to the transparent liquid 16 through the insulating film 13, and the transparent liquid 16 is locally vaporized at the position corresponding to the small-width portion 12e. An initial microbubble 17 is generated around the small-width portion 12e (see a virtual line in FIGS. 3 and 4). The microbubble 17 increases in size with the elapse of the electrical connection time t.

Here, if the following definition is made, the relationship of the following expression (2) is established.

r: the radius of the dome portion 19 of the microbubble 17
K: the curvature of the interface B

[Equation 2]

$$r = \frac{1}{K} \qquad (2)$$

The container 10 of the microlens 1 constantly exchanges heat with the outside and is deprived of a predetermined amount $Q_{out}$ of heat. Thus, if electrical connection is stopped after the initial microbubble 17 is generated, the radius r of the microbubble 17 decreases such that an internal pressure P is equal to the surface tension of the transparent liquid 16. The amount $Q_{out}$ of heat emitted from the container 10 is influenced by the coefficient of heat conduction of the wall portion 11 of the container 10.

The transparent liquid 16 deprived of heat decreases in temperature, and the microbubble 17 is also deprived of heat through the interface B. As a result, the temperature decreases by a temperature change ΔT. The proportional relationship of the following expression (3) is established between the amount $Q_{out}$ of heat and the temperature change ΔT.

[Equation 3]

$$\Delta Q_{out} \propto \Delta T \qquad (3)$$

The following expression (4) is established by the equation of state of gas. For this reason, if the temperature decreases by the temperature change ΔT, the product of the internal pressure $P_B$ of the microbubble 17 and a volume change ΔV decreases.

[Equation 4]

$$P_B \Delta V = nR\Delta T \qquad (4)$$

Here, the following definition is made.
$P_B$: an internal pressure of the microbubble 17
ΔV: a volume change of the microbubble 17
n: the number of moles of the microbubble 17
R: a gas constant
ΔT: a temperature change of the microbubble 17

As the product $P_B \Delta V$ of the internal pressure $P_B$ and the volume change ΔV decreases, the internal pressure $P_B$ becomes equal to an external pressure when the microbubble 17 is pressed from the transparent liquid 16. For this reason, the volume of the microbubble 17 decreases until the internal pressure $P_B$ becomes equal to the external pressure.

In order to maintain the radius r of the microbubble 17, it is necessary to continuously give a predetermined amount Qe of heat by the heater 12. The radius r of the microbubble 17 can expand or contract by turning on or off the heater 12 to selectively give a predetermined amount Qe of heat. The relationship between the amount Q of heat generation of the heater 12 and the radius r of the microbubble 17 is as expressed by the following expression (5).

[Equation 5]

$$Q \begin{cases} = Q_e: \text{the radius } r \text{ of a vapor bubble is maintained} \\ > Q_e: \text{the radius } r \text{ of a vapor bubble increases} \\ 0: \text{the radius } r \text{ of a vapor bubble decreases} \end{cases} \qquad (5)$$

Thus, it is possible to control the shape and the radius r (that is, the curvature K) of the microbubble 17 (interface B) by turning on or off of the heater 12, thereby controlling the refractive power of the above-described concave lens.

As described above, in the microlens 1 of this embodiment, the heaters 12, the control part 3, the wirings 4, and the insulating films 13 are provided to constitute a curvature control part (interface shape control means) 6 which controls the shape of the interface B. That is, the curvature control part 6 has a function of carrying out temperature adjustment of the transparent liquid 16 and the microbubbles 17 to thermally expand or contract the transparent liquid 16 and the microbubbles 17, and controlling the curvature K of the interface B by thermal expansion or contraction.

Figure 5:
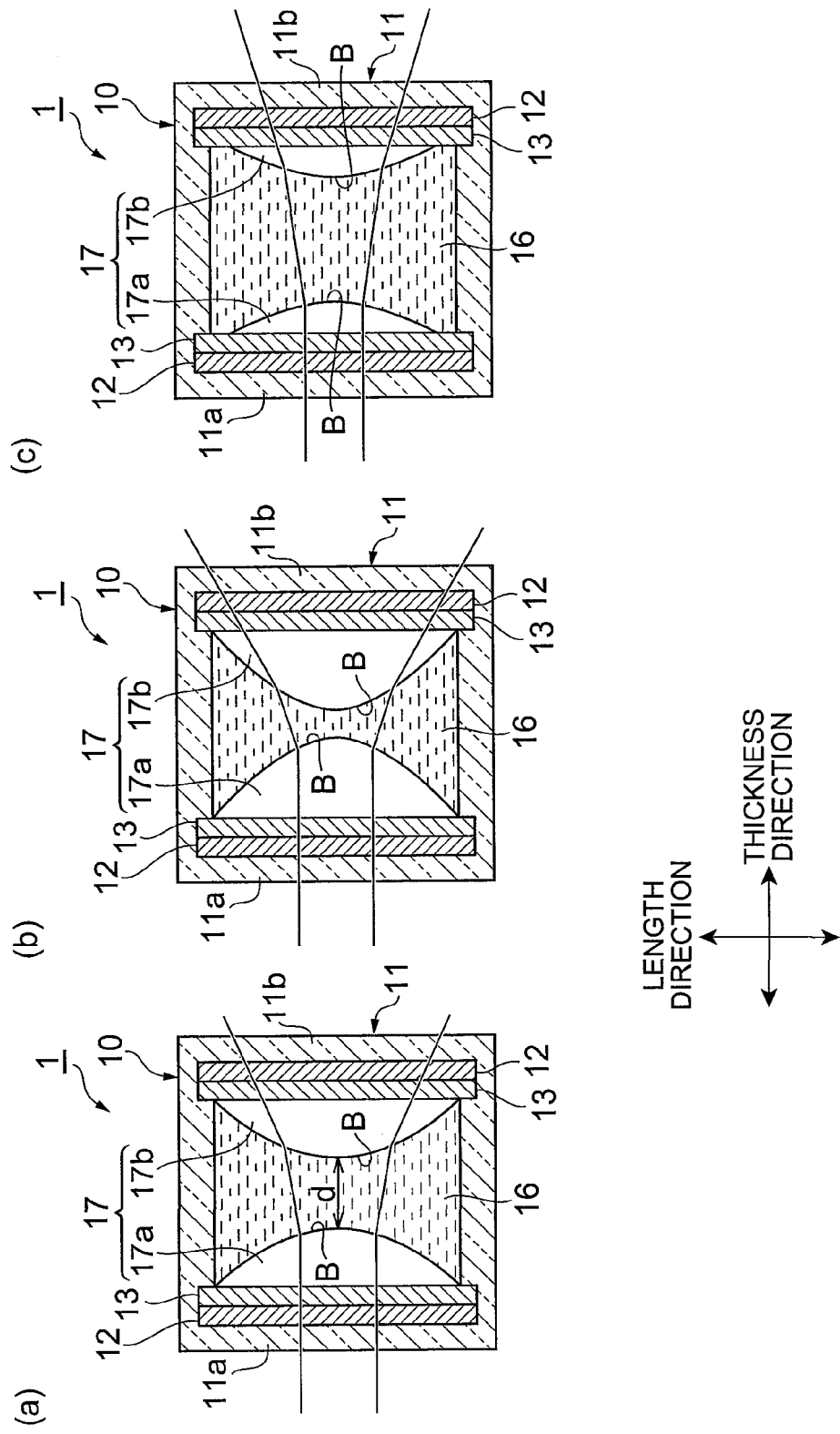
FIG. 5 is a sectional side view showing a relationship between curvature and refractive power of a lens.

FIG. 5 is a sectional side view showing a relationship between curvature and refractive power of a lens. As shown in FIG. 5(a), when the incidence-side microbubble 17a and the emission-side microbubble 17b are separated at the distance d, the refractive power (lens power) $\phi$ is expressed by the following expression (6).

[Equation 6]

$$\phi = (n_a - 1)\left[K_1 - K_2 + (n_a - 1)K_1 K_2 \frac{d}{n_a}\right] \quad (6)$$

Here, the following definition is made.
$\phi$: refractive power (lens power) of the microlens 1
$n_a$: a refractive index of the transparent liquid 16
$K_1$: curvature of the interface B formed by the incidence-side microbubble 17a
$K_2$: curvature of the interface B formed by the emission-side microbubble 17b
d: the distance between the incidence-side microbubble 17a and the emission-side microbubble 17b As expressed by the above-described expression (2), if the radii of the incidence-side microbubble 17a and the emission-side microbubble 17b are determined, the curvatures $K_1$ and $K_2$ are determined. As expressed by the expression (6), predetermined refractive power $\phi$ is obtained for predetermined curvatures $K_1$ and $K_2$.

For example, as shown in FIG. 5(b), if the curvatures $K_1$ and $K_2$ become greater than those shown in FIG. 5(a), the refractive power $\phi$ increases, and the refractive effect of light by the microlens 1 is intensified. As shown in FIG. 5(c), if the curvatures $K_1$ and $K_2$ become smaller than those shown in FIG. 5(a), the refractive power $\phi$ decreases, and the refractive effect of light by the microlens 1 is weakened.

Figure 6:
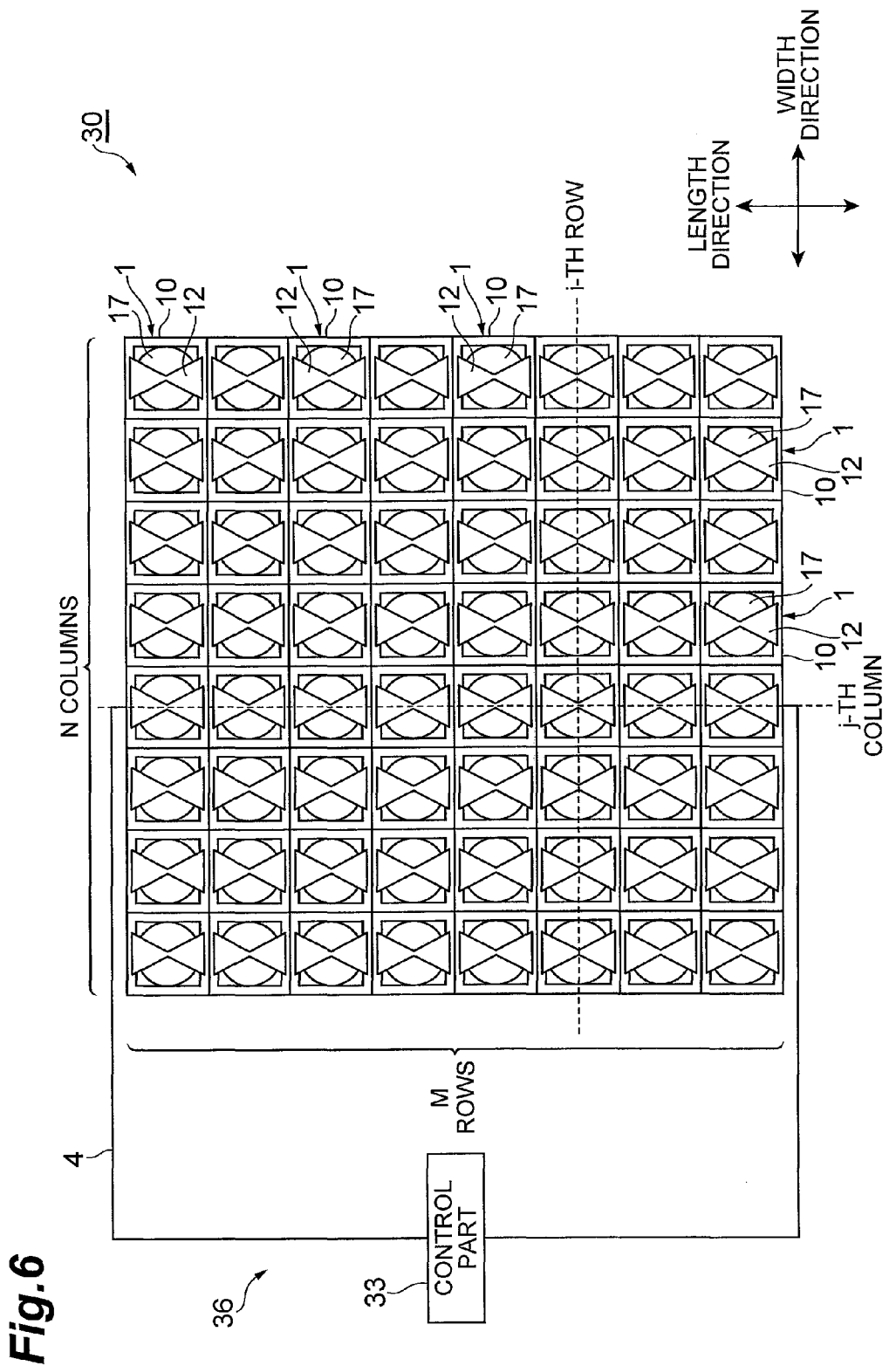
FIG. 6 is an outline diagram showing an optical element array in which a plurality of optical elements of FIG. 1 are arranged.
Figure 7:
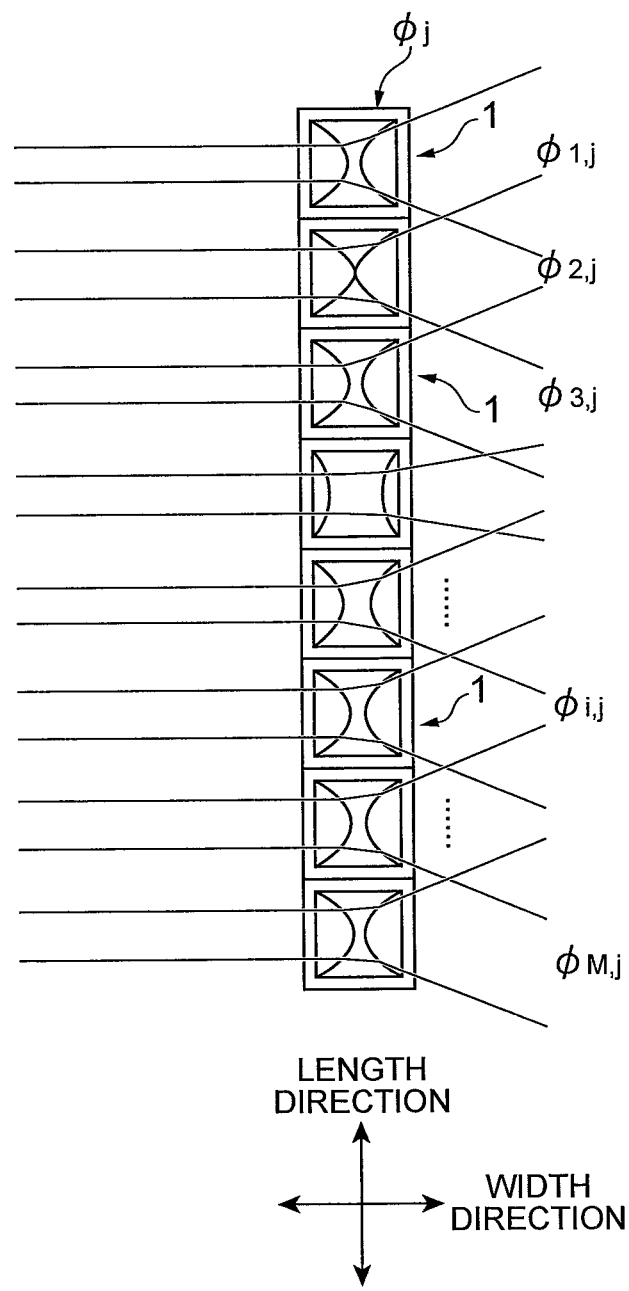
FIG. 7 is a side view of a container part in FIG. 6.

Next, microlens array of this embodiment in which a plurality of microlenses 1 are arranged will be described. FIG. 6 is an outline diagram showing a microlens array in which a plurality of microlenses 1 of FIG. 1 are arranged. FIG. 7 is a side view of a container part in FIG. 6. As shown in FIGS. 6 and 7, a microlens array (optical element array) 30 is configured such that a plurality of microlenses 1 are arranged in the length direction and the width direction. In the microlens array 30, the microlenses 1 are arranged in a matrix of M rows and N columns (where M and N are natural numbers). The microlens array 30 includes containers 10 which are arranged in a matrix of M rows and N columns, and a control part 33 which is connected to the containers 10 through wirings 4 and controls the amount of heat generation of the heater 12 in each container 10.

In the microlens array 30, the control part 33, the wirings 4, the heater 12 of each microlens 1, and the insulating films 13 (see FIG. 1) are provided to constitute a curvature control part (interface shape control means) 36 which controls the shape of the interface B. The control part 33 may include the control part 3 (see FIG. 1) of the microlens 1 for each microlens 1, or may be collectively constituted as a single device to control the shape of the interface B in each container 10.

In the microlens array 30, the curvature K of the interface B formed in each container 10 is controlled, making it possible to freely change the refractive power $\phi$ of each microlens 1. For example, in the microlens array 30, the refractive power $\phi_j$ in a j-th column becomes refractive power $\phi_{1,j}$ to $\phi_{M,j}$, and the refractive power in the microlens 1 of the i-th row and the j-th column becomes refractive power $\phi_{i,j}$ (see FIG. 7).

Figure 8:
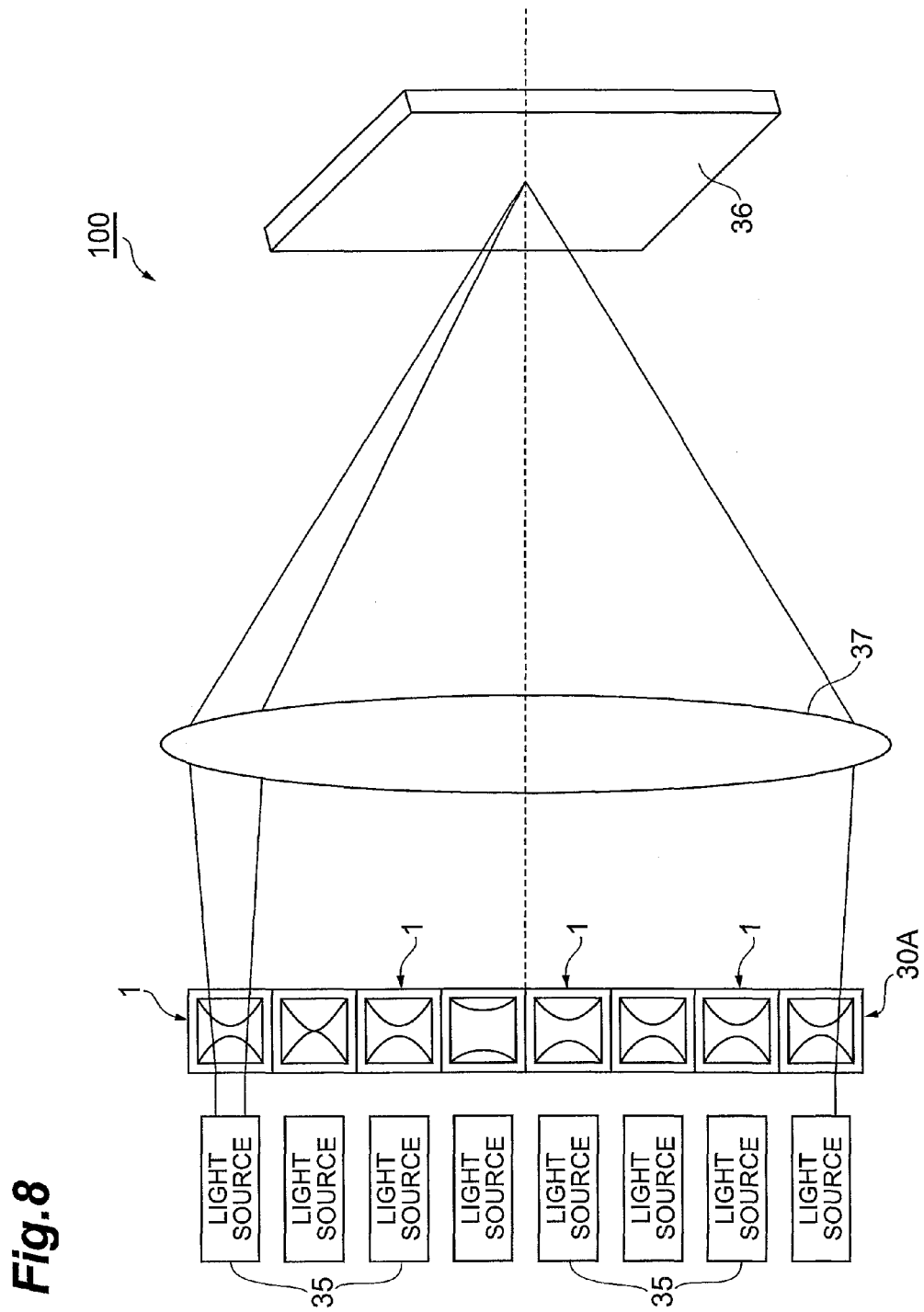
FIG. 8 is a diagram showing an example of an optical system using the optical element array of FIG. 6.
Figure 9:
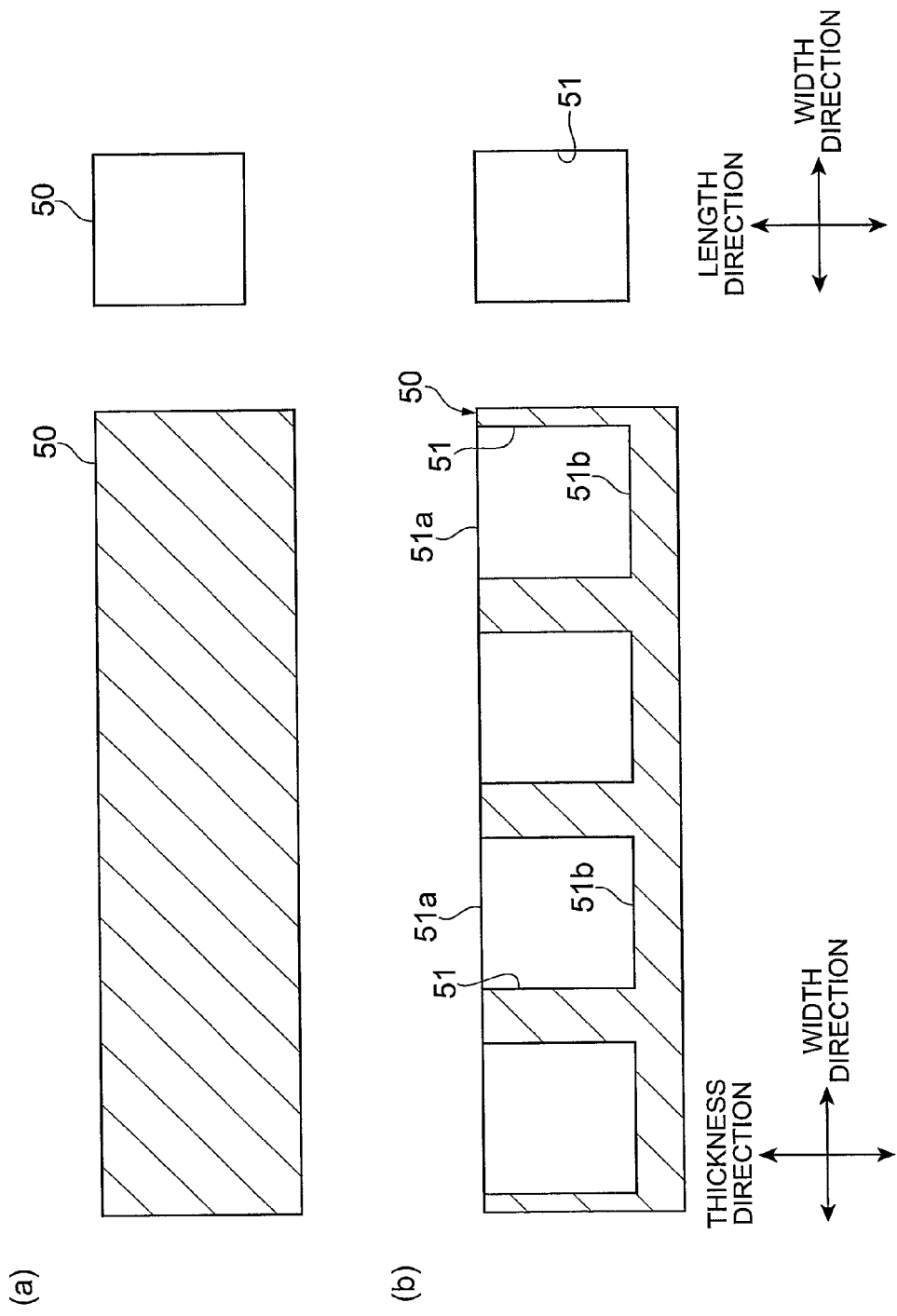
FIG. 9 is a sectional view and a top view showing a manufacturing process of the optical element array of FIG. 6.
Figure 10:
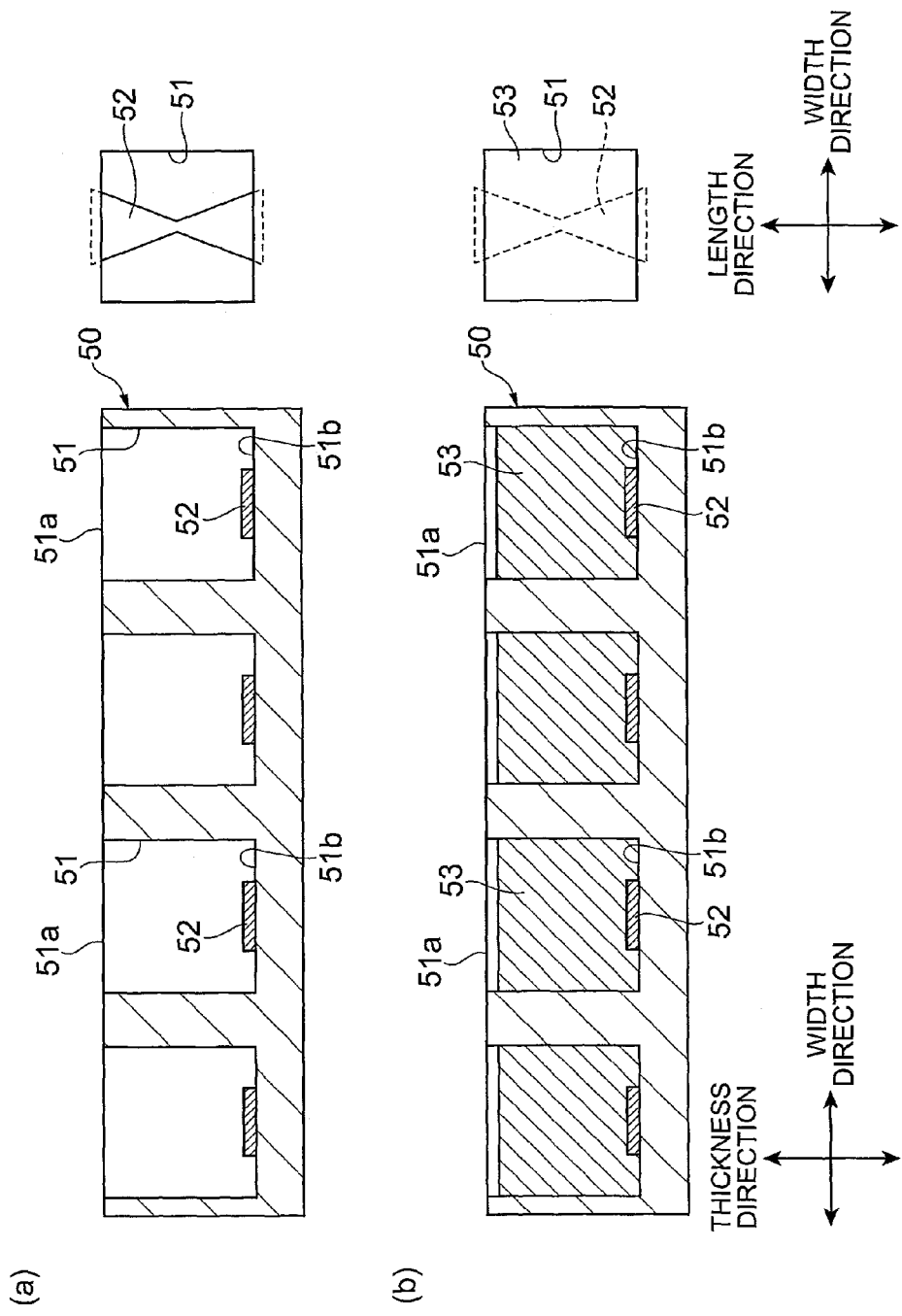
FIG. 10 is a sectional view and a top view showing a manufacturing process subsequent to FIG. 9.
Figure 11:
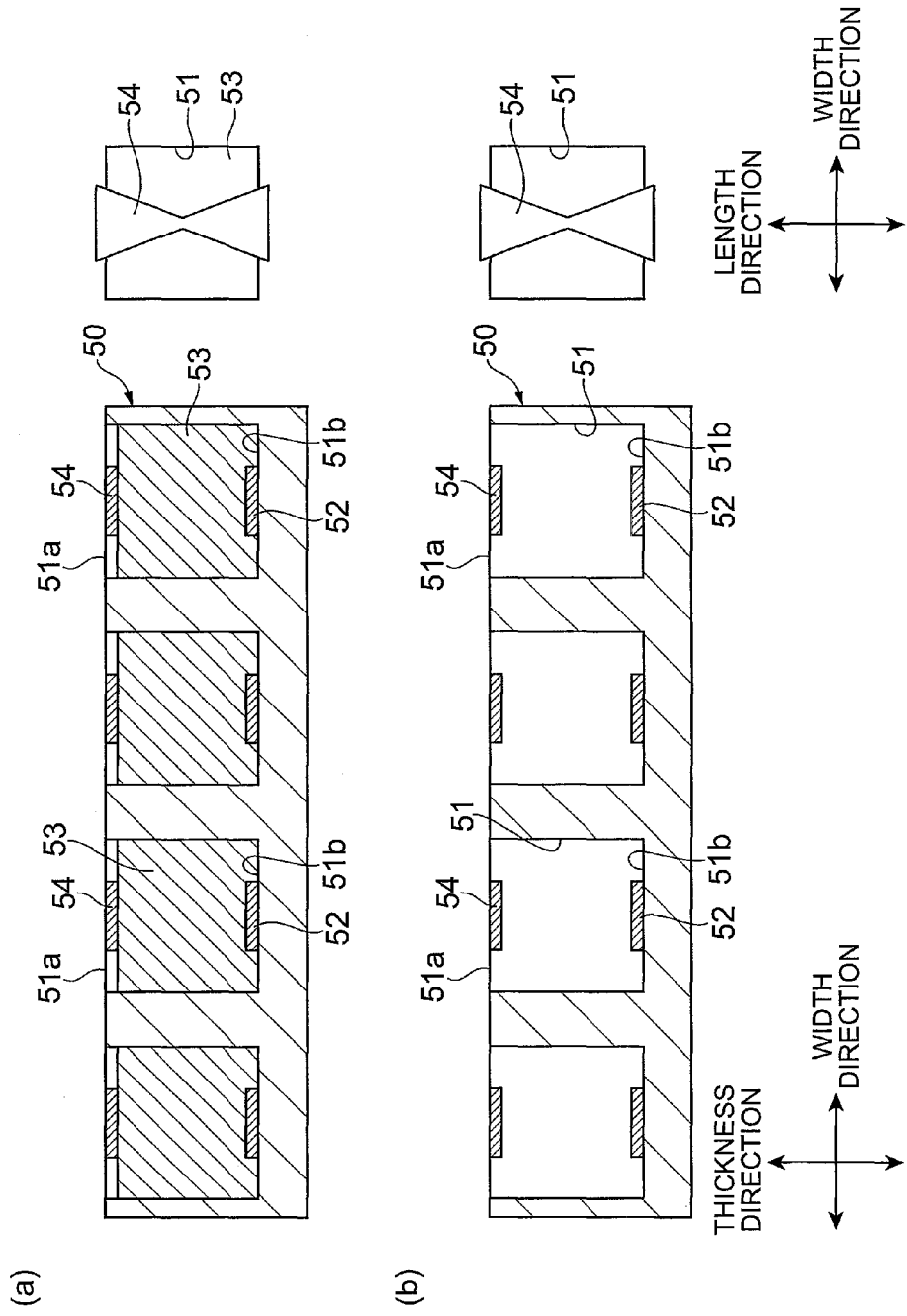
FIG. 11 is a sectional view and a top view showing a manufacturing process subsequent to FIG. 10.
Figure 12:
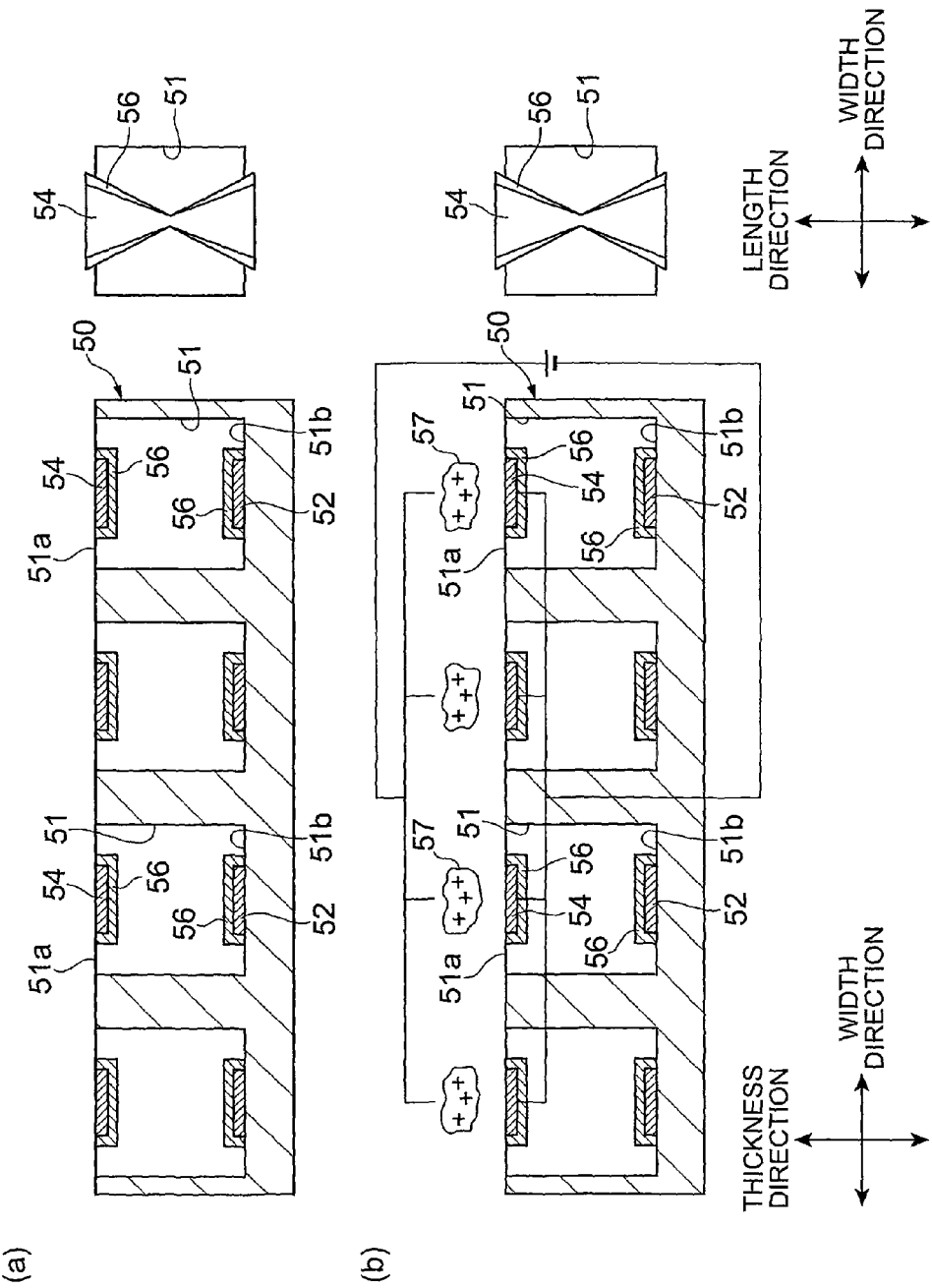
FIG. 12 is a sectional view and a top view showing a manufacturing process subsequent to FIG. 11.
Figure 13:
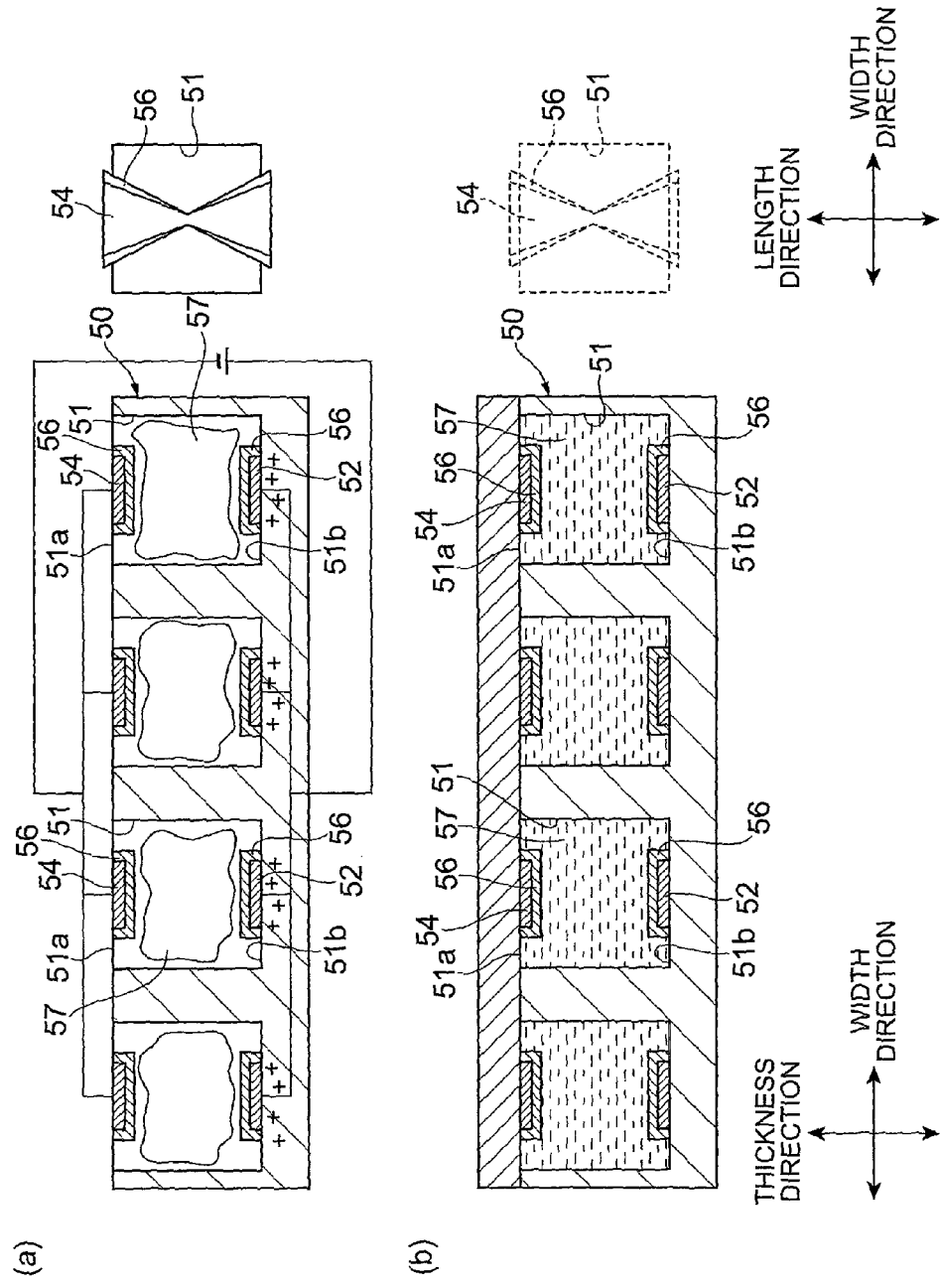
FIG. 13 is a sectional view and a top view showing a manufacturing process subsequent to FIG. 12.

As shown in FIG. 8, an optical system 100 using a microlens array can be constituted. The optical system 100 has a plurality of light sources (for example, laser light sources or the like) 35, and a microlens array 30A in which microlenses 1 are arranged to correspond to the light sources 35. The optical system 100 also has an optical relay lens 37 which is arranged between the microlens array 30A and a projection surface 36. In the optical system 100, it becomes possible to carry out enlargement or reduction of a projected image on the projection surface 36, fluctuation correction, or the like.

Subsequently, a method of manufacturing the microlens array 30 will be described. FIGS. 9 to 13 are sectional views and top views of a manufacturing process of the microlens array 30 of FIG. 6. In the respective drawings, the left side is a sectional view when viewed from the length direction, and the right side is a top view when viewed from the thickness direction. In the sectional view, an example is shown where the number of microlenses is 4. In the top view, only one microlens 1 is shown. In the following description, a case will be described where lithium niobate is used for the container 10, and an ITO electrode is used for the heater 12.

First, as shown in FIG. 9(a), a lithium niobate substrate 50 having a predetermined thickness is prepared (S1). Next, as shown in FIG. 9(b), voids 51 having a substantially cubic shape are formed such that one surface in the thickness direction is opened by etching (S2). Here, each void 51 correspond to the internal space S of the container 10. The opened surface of each void 51 is referred to as a top surface (one surface) 51a, and a surface facing the one surface is referred to as a bottom surface (another surface) 51b.

Next, as shown in FIG. 10(a), a lower ITO electrode 52 is formed at the position of the bottom surface 51b of each void 51 (S3). The lower ITO electrode 52 corresponds to the heater 12. Next, as shown in FIG. 10(b), an oxide film 53 is deposited at a predetermined height in each void 51 directly below the position of the top surface 51a (S4).

Next, as shown in FIG. 11(a), an upper ITO electrode 54 is formed at the position of the top surface 51a (S5). The upper ITO electrode 54 corresponds to the heater 12. Next, as shown in FIG. 11(b), the oxide film 53 is removed by etching (S6). That is, Steps S3 to S6 correspond to an electrode forming step of using a lithium niobate substrate (container) 50 having the opened top surface 51a, forming the upper ITO electrode (first electrode) 54 at the position of the top surface 51a, and forming the lower ITO electrode (second electrode) 52 at the position of the bottom surface 51b. The wiring 4 which connects the heater 12 and the control part 33 is formed in the same manner as the heater 12.

Next, as shown in FIG. 12(a), a gate oxide film 56 is formed so as to cover the lower ITO electrode 52 and the upper ITO electrode 54 (S7). The gate oxide film 56 corresponds to the insulating film 13. The gate oxide film 56 can be formed by a known CVD (Chemical Vapor Deposition) method in the related art.

Next, as shown in FIG. 12(b), a conductive liquid filler 57, such as perfluorocarbon, is prepared, and a positive voltage is applied to the filler 57 (the filler 57 is positively charged). The side (the lower side in the drawing) of the upper ITO electrode 54 facing the void 51 is connected to GND (grounded). The filler 57 flows from the top surface 51a into the void 51 (S8). The filler 57 corresponds to the transparent liquid 16. That is, Step S8 corresponds to a liquid inflow step of charging the filler 57, applying a voltage having reverse charge to the filler 57 to the upper ITO electrode 54, and allowing the filler 57 to flow from the top surface 51a into the container. According to the liquid inflow method, a so-called electrowetting phenomenon occurs to improve wetness of the filler 57 with respect to the upper ITO electrode 54 and to promote the inflow of the filler 57.

Next, as shown in FIG. 13(a), a positive voltage is applied to the lower ITO electrode 52. The upper ITO electrode 54 is connected to GND (grounded). The filler 57 is filled in the void 51 (S9). That is, Step S9 corresponds to a liquid filling step of applying a voltage having the same charge as the filler 57 to the upper ITO electrode 54, applying a voltage having reverse charge to the filler 57 to the lower ITO electrode 52, and filling the filler 57 in the container. According to the liquid filling method, a so-called electrowetting phenomenon occurs to improve wetness of the filler 57 with respect to lower ITO electrode 52, such that the filler 57 is filled around the lower ITO electrode 52 with no gap.

As shown in FIG. 13(b), UV curable resin 58 is formed so as to cover the top surface 51a of each of a plurality of voids 51 in the width direction and the length direction, and the voids 51 are sealed (S10). That is, through Step S10, the filler 57 is filled in the voids 51. Though not shown, the control part 33 (see FIG. 6) is connected to the lower ITO electrode 52 and the upper ITO electrode 54 through the wirings 4.

Through the sequence of steps, the microlens array 30 shown in FIG. 6 is manufactured.

According to the microlens 1 and the microlens array 30 of this embodiment, the transparent liquid 16 forming a liquid phase and the microbubbles 17 forming a gas phase are subjected to temperature adjustment by the curvature control part 6. The transparent liquid 16 and the microbubbles 17 subjected to temperature adjustment thermally expand or contract, such that the curved interface B formed between the transparent liquid 16 and the microbubbles 17 is changed. Thus, it becomes possible to control the interface shape, thereby forming a desired interface shape. Since Joule heat based on current application is used for temperature adjustment, it is possible to reduce a voltage to be applied compared to a case where a voltage is directly applied to the transparent liquid 16 or the microbubbles 17 in the container 10 to change the surface tension of the transparent liquid 16 or the microbubbles 17. Therefore, according to the microlens 1 and the microlens array 30, it is possible to reduce a voltage to be applied and also to form a desired interface shape.

For example, in an electrowetting method of the related art in which a voltage is directly applied, it is necessary to apply a voltage of about 100 V. In contrast, in this embodiment, it is possible to control the shape of the interface B with a very low voltage of about 5 V.

According to the microlens 1 and the microlens array 30, the microbubbles 17 forming a gas phase is hardly influenced by gravity because of a small mass per volume (low density). Therefore, it is possible to control the shape of the interface B accurately.

According to the microlens 1 and the microlens array 30, the transparent liquid 16 and the microbubbles 17 thermally expand or contract by the curvature control part 6, making it easy to change the shape of the interface B. Therefore, it becomes possible to control the interface shape.

According to the microlens 1 and the microlens array 30, since the curvature of the interface B is controlled by the curvature control part 6, it is possible to control refractive power φ when light passes through the container 10.

According to the microlens 1 and the microlens array 30, since electrical resistance increases in the small-width portion 12e at the center of the heater 12, the temperature of the small-width portion 12e is at the highest in the heater 12. Thus, it is possible to sufficiently heat the transparent liquid 16 or the microbubbles 17 near the center of the heater 12 with a small current. Therefore, it is possible to easily thermally expand the transparent liquid 16 or the microbubbles 17 and to easily change the phase of the transparent liquid 16 or the microbubbles 17, making it easy to control the shape of the transparent liquid 16 or the microbubbles 17.

According to the microlens 1 and the microlens array 30, the transparent liquid 16 is arranged so as to be sandwiched from both sides thereof by the incidence-side microbubble 17a and the emission-side microbubble 17b between the first sidewall 11a and the second sidewall 11b. For this reason, the interface B is formed which has two faces respectively rounded from the first sidewall 11a and the second sidewall 11b inside the container 10. Therefore, a concave lens can be formed between the first sidewall 11a and the second sidewall 11b by the two-face interface B.

According to the microlens 1 and the microlens array 30, it is possible to easily control the radius r of the microbubbles 17 depending on the electrical connection time t to the heaters 12 or the magnitude of a current I to be applied, thereby changing the refractive power φ of the lens. Since the refractive power φ depends on only the radius r of the dome portions 19 of the microbubbles 17, even when the liquid quality of the transparent liquid 16 is changed, it is possible to easily correct the refractive power φ only by changing the current I to be applied.

According to the microlens 1 and the microlens array 30, since the interface B is formed by a liquid phase and a gas phase, unlike the liquid phases, there is no case where the phases are mixed. Thus, it is possible to easily form the interface B and there is little change in the quality of the material. As described above, since the gas phase is hardly influenced by gravity, as the container 10 decreases in size, the container 10 is robust to gravity. The size or shape of the microbubbles 17 is determined by balance of heat release outside the container 10 and heating by the heaters 12, thereby easily controlling the shape of the interface B.

According to the microlens array 30, in each microlens 1, it is possible to control the shape of the interface B formed in the container 10. Therefore, it is possible to freely change the refractive power of each microlens 1. For example, if a plurality of light sources 35 are arranged and the microlenses 1 are arranged to correspond to the light sources 35, it is possible to freely condense or diffuse light emitted from a plurality of light sources 35.

According to the method of manufacturing the microlens array 30 of this embodiment, in the liquid inflow step S8, when the charged filler 57 flows into the void 51 from the top surface 51a, a voltage having reverse charge to the filler 57 is applied to the upper ITO electrode 54 formed in the top surface 51a. For this reason, wetness of the filler 57 in contact with the surface of the upper ITO electrode 54 is improved. Therefore, it is possible to achieve a smooth inflow of the filler 57 from the top surface 51a. In the liquid filling step S9, a voltage having the same charge as the filler 57 is applied to the upper ITO electrode 54, and a voltage having reverse charge to the filler 57 is applied to the lower ITO electrode 52. For this reason, wetness of the filler 57 in contact with the surface of the lower ITO electrode 52 is improved. Therefore, it is possible to fill the filler 57 at the corners in the periphery of the bottom surface 51b.

According to the method of manufacturing an optical element, even when the container 10 is small, it is possible to fill the filler 57 at the corners of the container 10. Therefore, it is possible to appropriately manufacture the microlens 1 and the microlens array 30.

Second Embodiment

Figure 14:
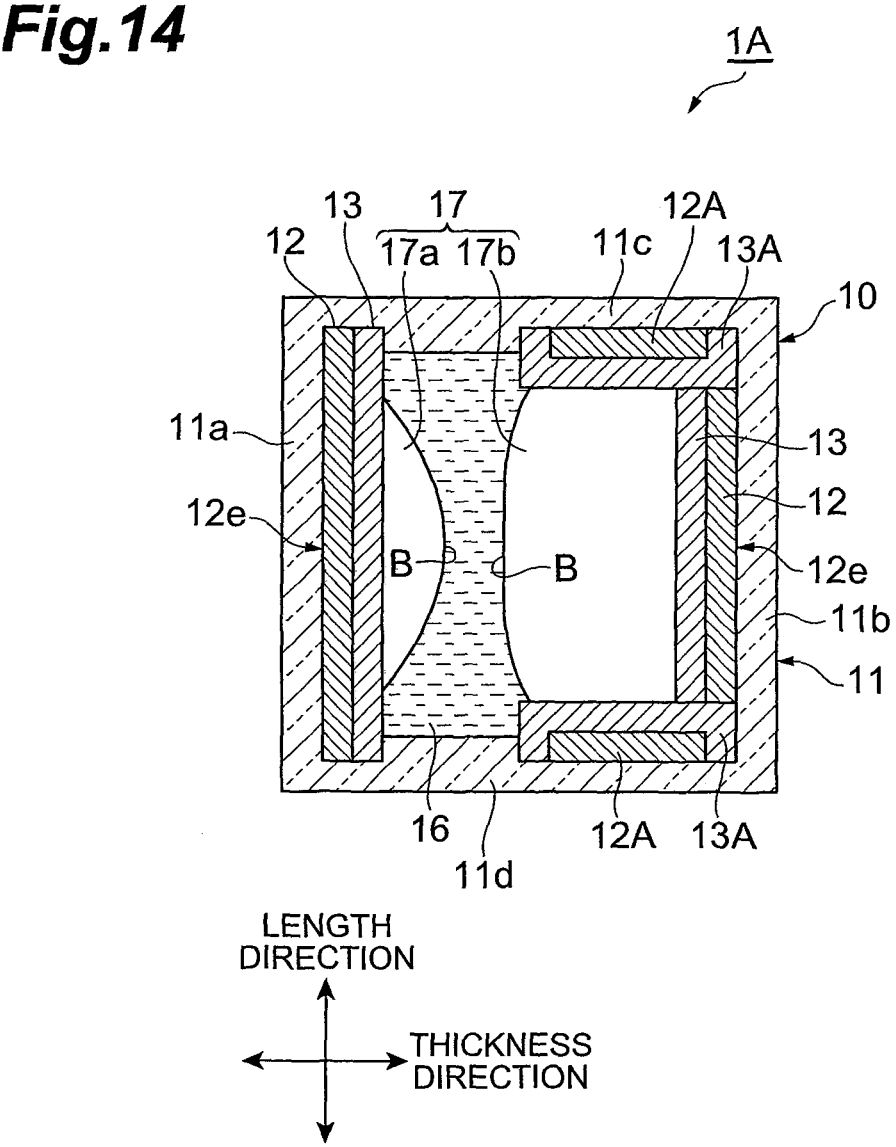
FIG. 14 is a sectional side view of a container part in an optical element according to a second embodiment.

FIG. 14 is a sectional side view of a container part in a microlens according to a second embodiment. As shown in FIG. 14, a microlens 1A of this embodiment is different in the microlens 1 of the first embodiment shown in FIGS. 1 and 2 in that heaters 12A serving as a heat-generating portion are provided in an upper wall 11c and a lower wall 11d. The heaters 12A are formed on the inner wall surfaces of the upper wall 11c and the lower wall 11d, and extend in the thickness direction from around the second sidewall 11b to near the centers of the walls 11c and 11d. Insulating films 13A are formed so as to cover the heaters 12A. In FIG. 14, the control part 3 is not shown (hereinafter, the same is applied to FIGS. 15, 16, 18, and 19).

According to the microlens 1A, the incidence-side microbubble 17a and the emission-side microbubble 17b can be asymmetrically shaped. Specifically, the emission-side microbubble 17b can be arranged in the periphery of the second sidewall 11b as well as in the periphery of the walls 11c and 11d, and the radius r can be increased. With this configuration, it is possible to increase the curvature of the incidence-side microbubble 17a and also to control the curvature of the emission-side microbubble 17b.

Third Embodiment

Figure 15:
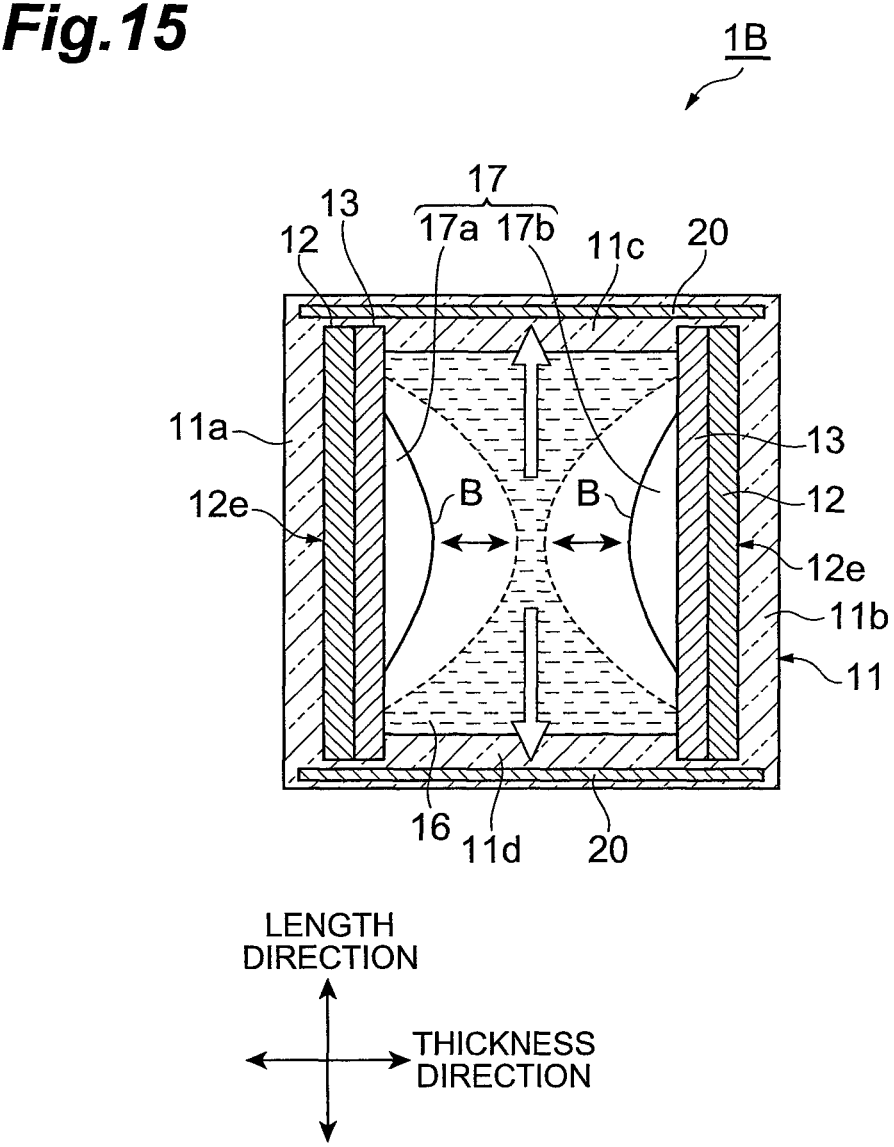
FIG. 15 is a sectional side view of a container part in an optical element according to a third embodiment.

FIG. 15 is a sectional side view of a container part in a microlens according to a third embodiment. As shown in FIG. 15, a microlens 1B of this embodiment is different from the microlens 1 of the first embodiment shown in FIGS. 1 and 2 in that Peltier elements 20 serving as a cooling section are buried in an upper wall 11c and a lower wall 11d. The Peltier elements 20 may be substantially buried over the entire surfaces of the upper wall 11c and the lower wall 11d or may be buried in a part of the upper wall 11c and the lower wall 11d.

According to the microlens 1B, it is possible to efficiently cool the microbubbles 17 in the container 10 by the Peltier elements 20 and to increase a response speed in the course of heat absorption. Thus, it is possible to improve response performance at the time of switching between heat generation and heat absorption and to rapidly control the size of the microbubbles 17. In this embodiment, a route in which heat absorption occurs is in order of the microbubbles 17, the transparent liquid 16, the walls 11c and 11d, and the Peltier elements 20.

Fourth Embodiment

Figure 16:
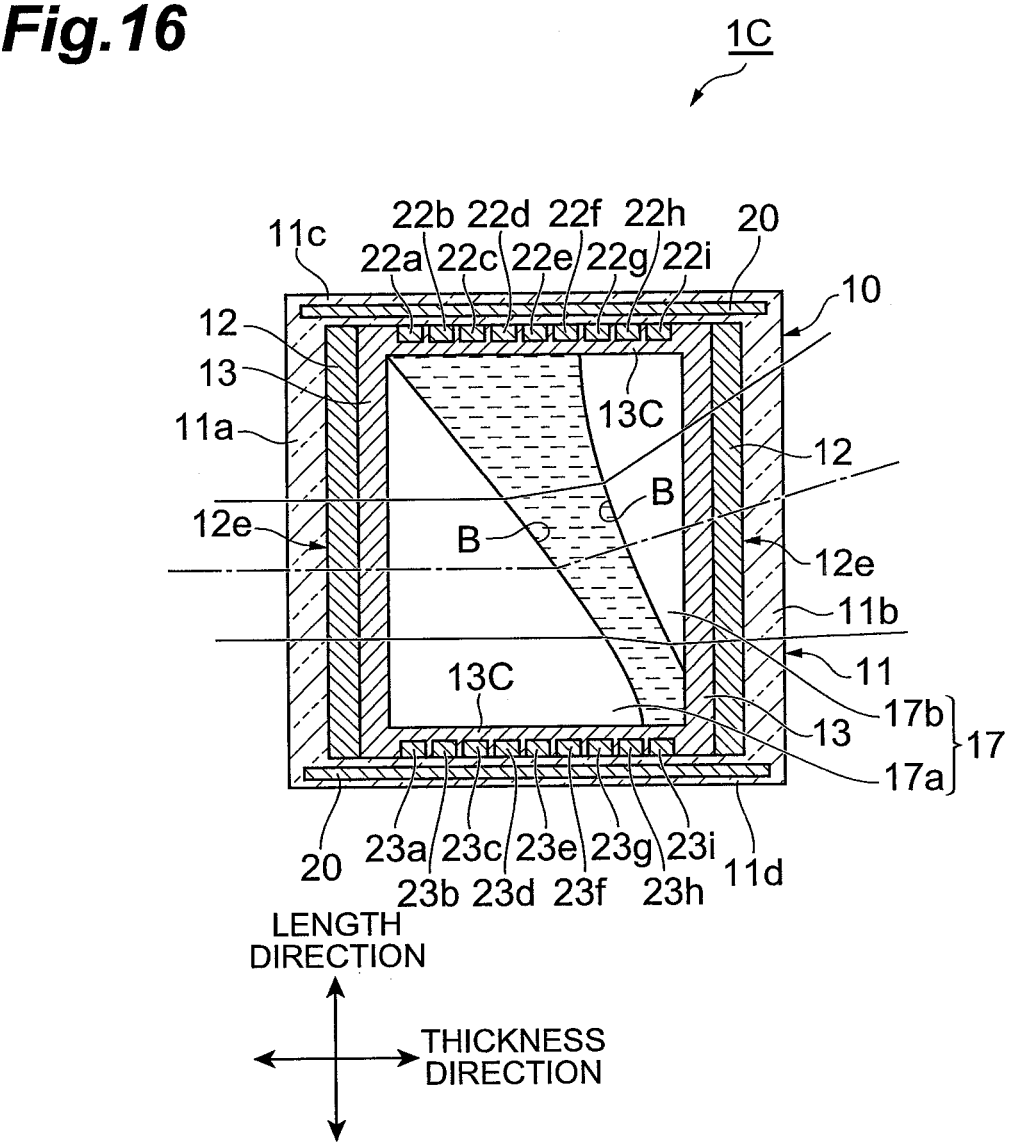
FIG. 16 is a sectional side view of a container part in an optical element according to a fourth embodiment.

FIG. 16 is a sectional side view of a container part in a microlens according to a fourth embodiment. As shown in FIG. 16, a microlens 1C of this embodiment is different from the microlens 1B of the third embodiment shown in FIG. 15 in that heaters 22a to 22i and heaters 23a to 23i serving as a plurality of small heat-generating portions arranged to be separated from each other in the thickness direction are provided in an upper wall 11c and a lower wall 11d. The heaters 22a to 22i and the heaters 23a to 23i may be substantially formed over the entire surfaces of the upper wall 11c and the lower wall 11d or may be formed in a part of the upper wall 11c and the lower wall 11d. Insulating films 13C are formed so as to cover the heaters 22a to 22i and the heaters 23a to 23i.

According to the microlens 1C, it is possible to finely control the wet state by the transparent liquid 16 (or the generation state of the microbubbles 17) in the upper wall 11c and the lower wall 11d by the heaters 22a to 22i and the heaters 23a to 23i. In the example shown in FIG. 16, some heaters 22f to 22i on the upper wall 11c side and all the heaters 23a to 23i on the lower wall 11d side are turned on, such that wetness of the wall surfaces of the insulating films 13C near the heaters is improved and the occurrence of microbubbles 17 is advanced, thereby forming the interface B shown in FIG. 16. Therefore, it becomes possible to control the emission angle of light.

In the microlens 1C, the emission angle of light can be controlled in the above-described manner. For this reason, when a plurality of microlenses 1C are arranged to constitute the same system as the optical system 100 shown in FIG. 8, it is possible to make a focal distance variable. When the system is applied to a head-up display (HUD) for a vehicle, it is possible to use both a distant display image and a near display image in HUD display.

Figure 17:
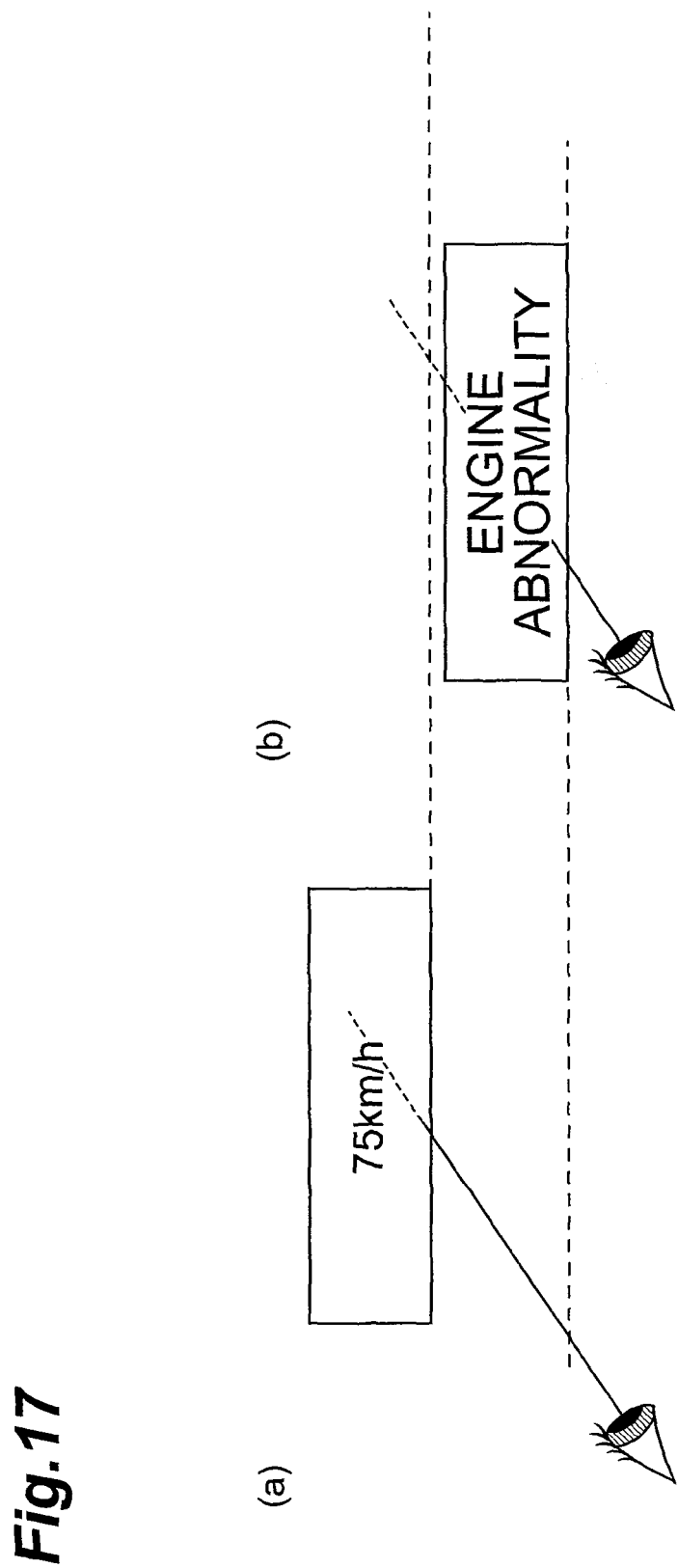
FIG. 17 is a diagram showing a video display example when the optical element of FIG. 16 is applied to a head-up display.

For example, in a normal display state shown in FIG. 17(a), "75 km/h" representing a vehicle speed is displayed at a predetermined position in front of a driver. Meanwhile, in a display state in an emergency, such as display of a warning (warning information), as shown in FIG. 17(b), a message in an emergency "engine abnormality" is displayed so as to be viewed near the driver. In this way, in an emergency, warning information is displayed as a near display image, such that the driver can instantaneously notice the warning information.

Fifth Embodiment

Figure 18:
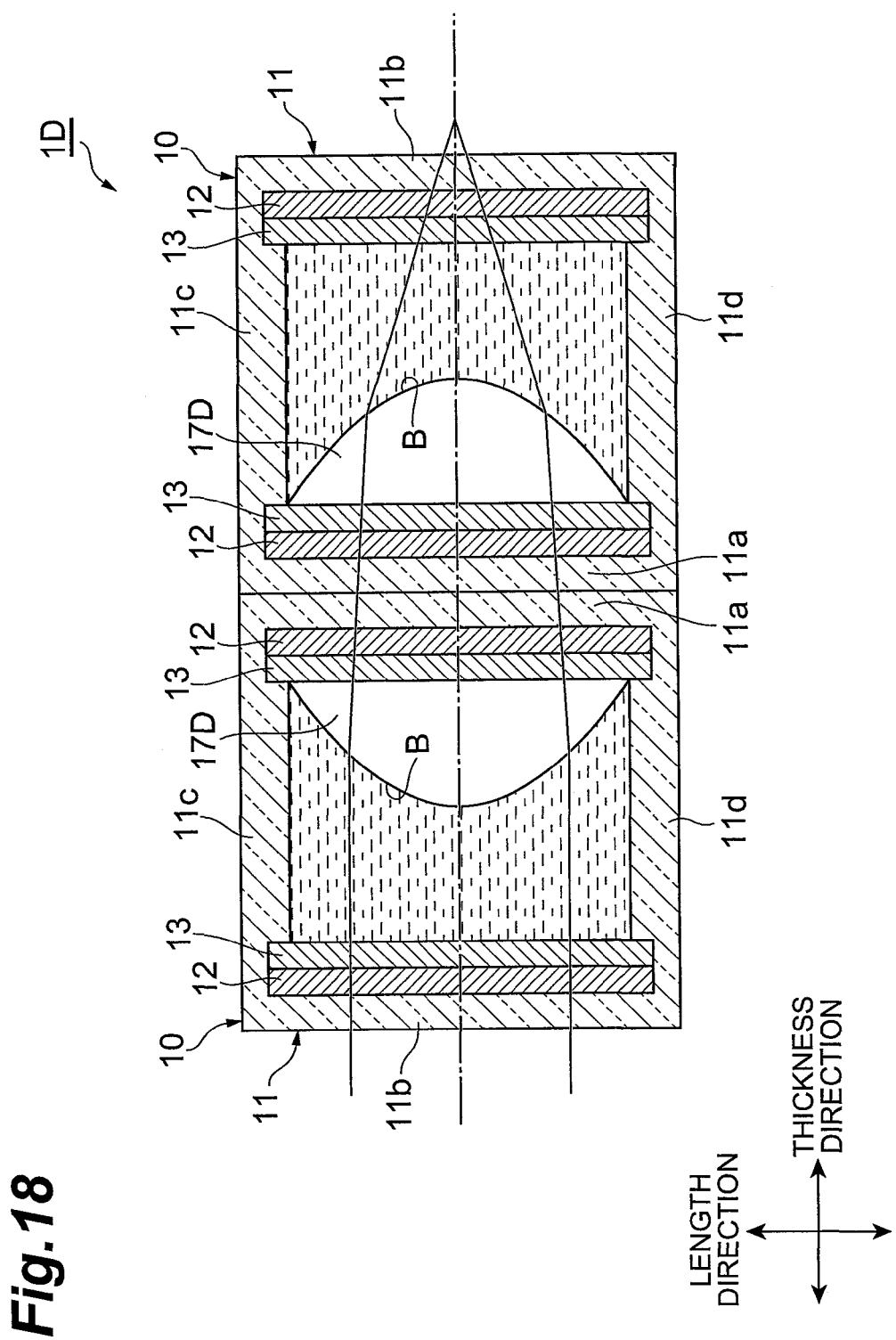
FIG. 18 is a side sectional view of a container part in an optical element according to a fifth embodiment.
Figure 19:
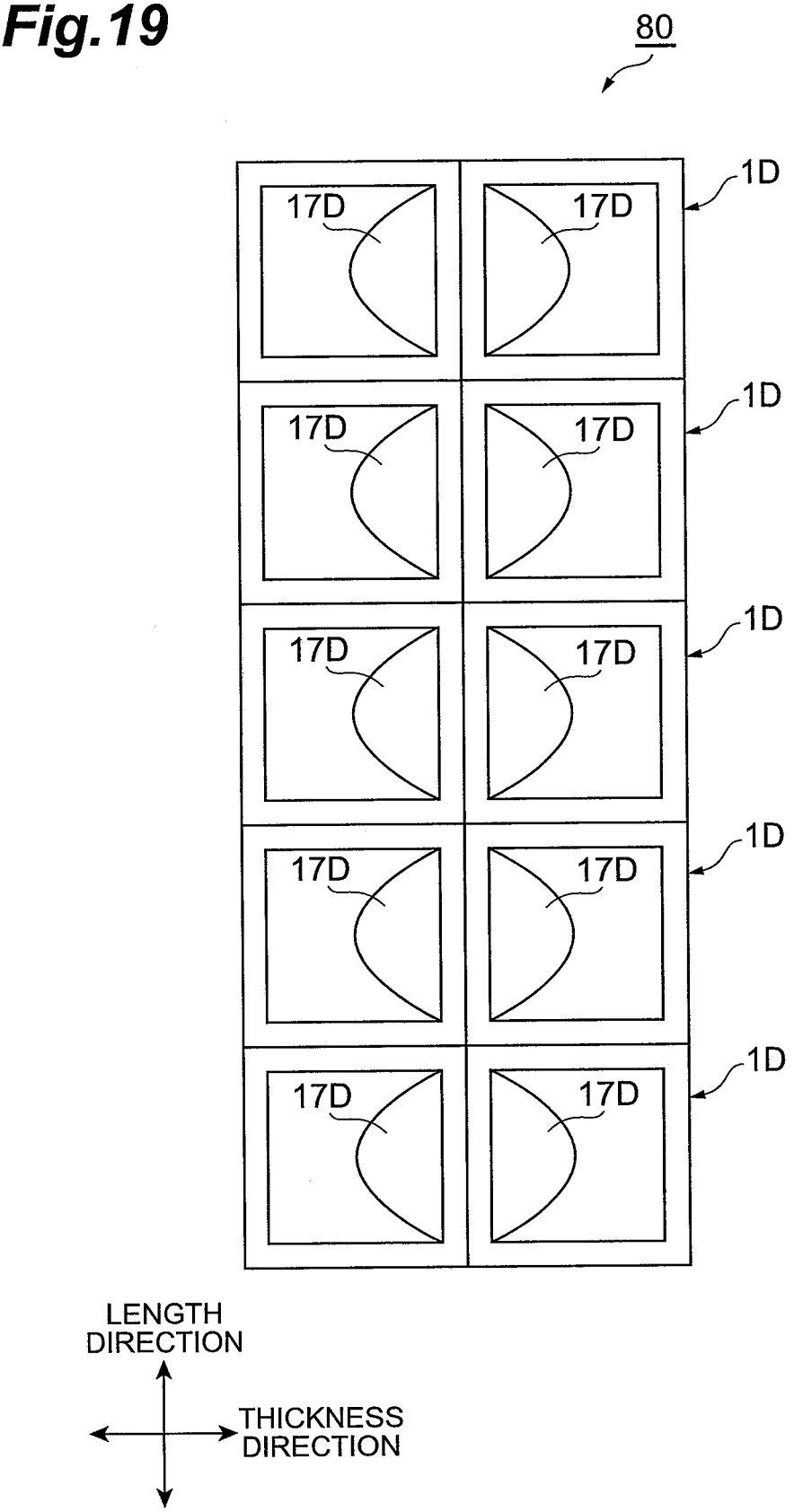
FIG. 19 is a side view of an optical element array in which a plurality of optical elements shown in FIG. 18 are arranged.

FIG. 18 is a sectional side view of a container part in a microlens according to a fifth embodiment. As shown in FIG. 18, a microlens 1D of this embodiment is different from the microlens 1 of the first embodiment shown in FIGS. 1 and 2 in that two containers 10 are provided, the first sidewalls 11a of the container 10 are bonded to each other, microbubbles 17D are arranged only around the first sidewalls 11a, and no microbubble is arranged around the second sidewalls 11b.

Specifically, in the microlens 1D, the heaters 12 formed on the first sidewall 11a side is turned on, and the heaters 12 formed on the second sidewall 11b side is turned off. When this happens, the microbubbles 17D can be generated only around the first sidewalls 11a.

According to the microlens 1D, a convex lens can be formed over the two containers 10 such that the bonded first sidewalls 11a are included in the cross-section. The microlenses 1D may be arranged in the length direction to constitute a convex lens array 80 shown in FIG. 19.

Although the embodiments of the invention have been described, the invention is not limited to the foregoing embodiments. For example, although in the foregoing embodiments, a case has been described where all the wall portions of the six faces of the container 10 are formed of a transparent insulating film, only the sidewalls 11a and 11b may be formed of a transparent insulating film. That is, the four faces excluding the sidewalls 11a and 11b may be formed of a nontransparent insulating film.

Although in the foregoing embodiments, a case has been described where the transparent liquid 16 and the microbubbles 17 are subjected to temperature adjustment by the curvature control part 6, either the transparent liquid 16 or the microbubbles 17 may be subjected to temperature adjustment by the curvature control part 6.

INDUSTRIAL APPLICABILITY

According to the invention, it is possible to reduce a voltage to be applied and also to form a desired interface shape.

REFERENCE SIGNS LIST 1, 1A, 1B, 1C, and 1D: microlens (optical element), 6: curvature control part (interface shape control means), 10: container, 11a: first sidewall (first wall portion), 11b: second sidewall (second wall portion), 12: heater (heat-generating portion), 12e: small-width portion,
16: transparent liquid (first transparent material),
17, 17a, 17b: microbubble (second transparent material), 30: microlens array (optical element array), 36: curvature control part (interface shape control means), B: interface, K, $K_1$, $K_2$: curvature.

The invention claimed is:

1. An optical element comprising:
a container which transmits light;
a first transparent material which is accommodated in the container to form a liquid phase;
a second transparent material which is accommodated in the container and generated by boiling of the first transparent material to form a gas phase, a curved interface inflated toward the first transparent material being formed between the first transparent material and the second transparent material; and
an interface shape controller that carries out temperature adjustment on at least one of the first transparent material and the second transparent material to control the shape of the interface, wherein
the interface shape controller has a plate-shaped heat-generating portion formed at the bottom of the container to generate heat through electrical connection, and
the heat-generating portion has a small-width portion at the center thereof.

2. An optical element comprising:
a container which transmits light;
a first transparent material which is accommodated in the container to form a liquid phase;
a second transparent material which is accommodated in the container and generated by boiling of the first transparent material to form a gas phase, a curved interface inflated toward the first transparent material being formed between the first transparent material and the second transparent material; and
an interface shape controller that carries out temperature adjustment on at least one of the first transparent material and the second transparent material to control the shape of the interface, wherein
the container has a first wall portion and a second wall portion arranged to face each other, and
the second transparent material is arranged separately around the first wall portion and the second wall portion.

3. An optical element comprising:
a container which transmits light;
a first transparent material which is accommodated in the container to form a liquid phase;
a second transparent material which is accommodated in the container and generated by boiling of the first transparent material to form a gas phase, a curved interface inflated toward the first transparent material being formed between the first transparent material and the second transparent material; and
an interface shape controller that carries out temperature adjustment on at least one of the first transparent material and the second transparent material to control the shape of the interface, wherein
two containers are provided,
each container has a first wall portion and a second wall portion arranged to face each other,
in each container, the second transparent material is arranged closer to the first wall portion than to the second wall portion, and
the first wall portions of the two containers are bonded to each other.

4. An optical element array in which a plurality of optical elements according to claim 1 are arranged.

5. A method of manufacturing an optical element, the optical element including a container which transmits light, a first transparent material which is accommodated in the container to form a liquid phase, a second transparent material which is accommodated in the container and generated by boiling the first transparent material to form a gas phase, a curved interface inflated toward the first transparent material being formed between the first transparent material and the second transparent material, and an interface shape control means for carrying out temperature adjustment on the at least one of the first transparent material and the second transparent material to control the shape of the interface, the method comprising:
an electrode forming step of using the container having one opened surface, forming a first electrode at a position of the one surface, and forming a second electrode at a position of another surface facing the one surface;
a liquid inflow step of charging a liquid, applying a voltage having reverse charge to the liquid to the first electrode, and allowing the liquid to flow into the container from the one surface; and
a liquid filling step of applying a voltage having the same charge as the liquid to the first electrode, applying a voltage having reverse charge to the liquid to the second electrode, and filling the liquid in the container.

6. An optical element array in which a plurality of optical elements according to claim 2 are arranged.

7. An optical element array in which a plurality of optical elements according to claim 3 are arranged.

* * * * *